US007986438B2

(12) United States Patent
Takahashi et al.

(10) Patent No.: US 7,986,438 B2
(45) Date of Patent: *Jul. 26, 2011

(54) IMAGE PROCESSING SYSTEM, APPARATUS, AND METHOD, AND COLOR REPRODUCTION METHOD

(75) Inventors: Kosei Takahashi, Tokyo (JP); Takeshi Makita, Tokyo (JP); Osamu Yamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 196 days.

This patent is subject to a terminal disclaimer.

(21) Appl. No.: 12/327,694

(22) Filed: Dec. 3, 2008

(65) Prior Publication Data

US 2009/0080009 A1  Mar. 26, 2009

Related U.S. Application Data

(63) Continuation of application No. 10/927,234, filed on Aug. 27, 2004, now Pat. No. 7,480,083, which is a continuation of application No. PCT/JP2003/009325, filed on Jul. 23, 2003.

(30) Foreign Application Priority Data

Jul. 30, 2002 (JP) ................................. 2002-221823
Jul. 30, 2002 (JP) ................................. 2002-221824
Jul. 30, 2002 (JP) ................................. 2002-221827

(51) Int. Cl.
*H04N 1/60* (2006.01)
(52) U.S. Cl. ......... 358/1.9; 358/474; 358/501; 358/518; 382/162; 382/275; 348/211; 348/234
(58) Field of Classification Search .................. 358/474, 358/500, 501, 518, 1.9, 1.2, 448, 527, 405, 358/504; 382/162, 167; 348/211, 234, 162, 348/167
See application file for complete search history.

(56) References Cited

U.S. PATENT DOCUMENTS 4,907,283 A    3/1990  Tanaka et al.
(Continued)

FOREIGN PATENT DOCUMENTS

JP           9-120185          5/1997
(Continued)

OTHER PUBLICATIONS

Japanese Office Action dated Oct. 6, 2008 in corresponding Japanese Application No. 2002-221827.
(Continued)

*Primary Examiner* — Negussie Worku
(74) *Attorney, Agent, or Firm* — Fitzpatrick, Cella, Harper & Scinto

(57) ABSTRACT

In a system for converting an input image signal input from an image input device into an output image signal to be output by an image output device, an image compression unit converts a spectral image input via an image input unit into R, G, and B data, obtains principal component data by making principal component analysis of the spectral image, and stores these data in an input image storage unit. When the principal component data and R, G, and B data are loaded and stored in an output image storage unit, a spectral reflectance reconstruction unit reconstructs the spectral reflectance of each pixel using these data. A printer model determines the dot quantities of inks used to record each pixel in an image output device on the basis of the calculated spectral reflectance, and generates an output image signal for the image output device. In this way, image data which allows to estimate the spectral reflectance characteristics of an input image is provided, and faithful color reproduction can be realized.

6 Claims, 33 Drawing Sheets

U.S. PATENT DOCUMENTS

| | | | |
|---|---|---|---|
| 5,864,364 A | 1/1999 | Ohyama et al. | |
| 5,915,076 A | 6/1999 | Sugita | |
| 6,061,153 A | 5/2000 | Sugita | |
| 6,529,522 B1 | 7/2001 | Her | |
| 6,549,653 B1* | 4/2003 | Osawa et al. | 382/162 |
| 7,009,640 B1* | 3/2006 | Ishii et al. | 348/223.1 |
| 7,072,507 B2* | 7/2006 | Ohga | 382/164 |
| 7,253,836 B1* | 8/2007 | Suzuki et al. | 348/234 |
| 7,692,831 B2* | 4/2010 | Nishikawa | 358/518 |
| 2002/0054237 A1 | 5/2002 | Nichogi | |
| 2004/0070777 A1* | 4/2004 | Nishikawa et al. | 358/1.9 |
| 2004/0240728 A1* | 12/2004 | Saikawa et al. | 382/162 |
| 2005/0018226 A1* | 1/2005 | Chiba | 358/1.9 |
| 2005/0111017 A1* | 5/2005 | Takahashi et al. | 358/1.9 |
| 2007/0165257 A1* | 7/2007 | Owaku | 358/1.9 |
| 2007/0223016 A1* | 9/2007 | Ichitani | 358/1.9 |
| 2008/0253650 A1* | 10/2008 | Kuniba | 382/167 |
| 2008/0297818 A1* | 12/2008 | Shimbaru | 358/1.9 |

FOREIGN PATENT DOCUMENTS

| | | |
|---|---|---|
| JP | 9-172649 | 6/1997 |
| JP | 9-233490 | 9/1997 |
| JP | 2000-333032 | 11/2000 |
| JP | 2001-134755 | 5/2001 |
| JP | 2002-98590 | 4/2002 |
| JP | 2002-185803 | 6/2002 |
| JP | 2003-326749 | 11/2003 |
| JP | 2003-326768 | 11/2003 |
| JP | 2004-64544 | 2/2004 |

OTHER PUBLICATIONS

Japanese Office Action dated Jul. 4, 2008 in corresponding Japanese Application No. 2002-221827.

* cited by examiner

F I G. 14
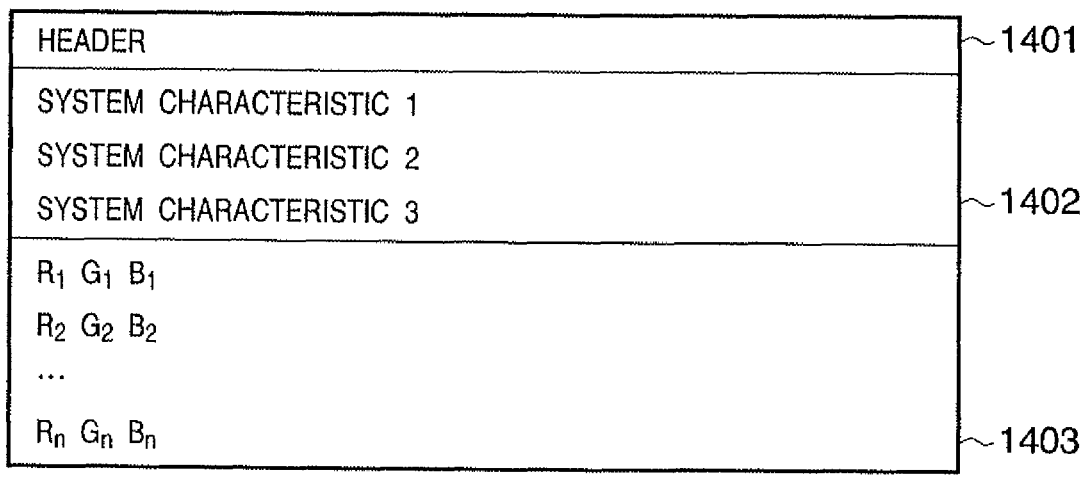

FIG. 31

| COLOR SAMPLE NAME | 400nm | ... | 700nm | C | M | Y | K |
|---|---|---|---|---|---|---|---|
| Pantone *** | 0.123 | ... | 0.234 | — | — | — | — |
| Pantone ××× | 0.453 | ... | 0.245 | — | — | — | — |
| ... | ... | ... | ... | ... | ... | ... | ... |
| DIC ○○○ | 0.455 | ... | 0.345 | — | — | — | — |

FIG. 32

| COLOR SAMPLE NAME | 400nm | ... | 700nm | C | M | Y | K |
|---|---|---|---|---|---|---|---|
| Pantone * | 0.123 | ... | 0.234 | 10 | 15 | 21 | 3** |
| Pantone ×××  | 0.453 | ... | 0.245 | — | — | — | — |
| ... | ... | ... | ... | ... | ... | ... | ... |
| DIC ○○○ | 0.455 | ... | 0.345 | — | — | — | — |

(BOLD LETTERS INDICATE ADDITIONALLY STORED DATA)

F I G. 33

| COLOR SAMPLE NAME | 400nm | ... | 700nm | C | M | Y | K |
|---|---|---|---|---|---|---|---|
| Pantone *** | 0.123 | ... | 0.234 | — | — | — | — |
| Pantone XXX | 0.453 | ... | 0.245 | — | — | — | — |
| ... | ... | ... | ... | ... | ... | ... | ... |
| DIC ○○○ | 0.455 | ... | 0.345 | — | — | — | — |
| **USER OUTPUT Pantone *** | 0.128 | ... | 0.239 | 10 | 15 | 21 | 3 |

(BOLD LETTERS INDICATE ADDITIONALLY STORED DATA)

IMAGE PROCESSING SYSTEM, APPARATUS, AND METHOD, AND COLOR REPRODUCTION METHOD

This application is a continuation application of U.S. patent application Ser. No. 10/927,234, filed on Aug. 27, 2004 (allowed), which was a continuation of PCT/JP2003/009325, filed on Jul. 23, 2003, the contents of which are incorporated by reference herein.

TECHNICAL FIELD

The present invention relates to an image processing method and apparatus suitably applied to image input/output apparatuses such as a digital camera, color printer, and the like and, more particularly, to an image processing method and apparatus, which use a color reproduction process for spectrally reproducing object colors (matching a spectral distribution).

The present invention also relates to an image processing method and apparatus for reproducing a color faithful to a target color in an image output apparatus such as a color printer or the like.

BACKGROUND ART

In general, in order to accurately reproduce a given target color using a color printer or the like, the operator repeats color adjustment by trial and error. That is, the operator makes color adjustment of an image on a display such as a CRT, LCD, or the like to obtain a desired print result. Then, the operator actually prints that image using the color printer, and then repeats color adjustment on the display after he or she observes the print result. For example, according to Japanese Patent Laid-Open No. 2000-333032, the following method is disclosed. That is, color samples and output images are displayed on the screen, and the control prompts the operator to designate a desired color and to correct the designated color. Then, color adjustment is made to reflect the corrected color onto the output image, so that the corrected color appears on the output image smoothly (continuously) with respect to surrounding colors. As another method, a color sample as a target color is measured using a calorimeter, and an output color closest to that calorimetric value, i.e., an output color which minimizes the color difference from the target color, is output.

Furthermore, as a method of storing the spectral reflectances of respective pixels so as to spectrally reproduce colors in an image, a method of compressing and storing spectral reflectances using principal component analysis has been proposed, as described in Japanese Patent Laid-Open. No. 2001-134755.

However, colors displayed on a display are generally specified by additive color mixing of three, R, G, and B phosphors, but colors output by a print process are specified by subtractive color mixing of four color inks, i.e., cyan, magenta, yellow, and black, or six color inks including light cyan and light magenta in addition to these four colors. For this reason, the color adjustment result and actual print result may often have equal tristimulus values such as XYZ or the like but different spectral reflectances. For example, since the method described in Japanese Patent Laid-Open No. 2000-333032 attains conditional color matching, color reproduction precision lowers when a print is observed in an environment different from that in which color adjustment was made, e.g., under different illumination light sources.

In the method of minimizing the color difference between a color sample and output color, tristimulus values can be matched, but spectral reflectances cannot be matched. As a result, since the color sample and output color have different spectral reflectances, they have largely different color appearances under different illumination light sources.

The method of compressing an image using principal component analysis, as described in Japanese Patent Laid-Open No. 2001-134755, has poor compatibility with RGB data as a general image storage method, because principal component coefficients of the principal component analysis results are stored as image information.

DISCLOSURE OF INVENTION

Under the above circumstances, it is desired to estimate the spectral distribution characteristics of an input image, to faithfully reproduce the estimated characteristics in an output image, and to acquire an image that can implement faithful, accurate color reproduction even in different observation environments.

It is also desired to implement accurate color reproduction by estimating and reproducing the spectral distribution characteristics of an input image in a color conversion process that converts an input image signal into an output image signal.

According to one aspect of the present invention, there is provided a method of controlling an image processing system, which converts an input image signal input from an image input device into an output image signal to be output by an image output device, comprising: a first generation step of generating image information that expresses an input image on a predetermined color space, and additional information required to estimate spectral reflectance characteristics of the input image, on the basis of the input image signal input from the image input device; a storage step of storing the image information and additional information generated in the first generation step in storage means; a calculation step of calculating spectral reflectances of pixels in the image on the basis of the image information and additional information stored in the storage means; and a second generation step of determining recording quantities of recording agents, which are used to record the pixels in the image and correspond to a plurality of colors, on the basis of the spectral reflectances calculated in the calculation step, and generating an output image signal for the image output device.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 14 shows an example of an image save format in the third embodiment;

FIG. 31 shows an example of the data configuration of a color sample database according to the seventh embodiment;

FIG. 32 shows an example of the data configuration of a color sample database according to the seventh embodiment; and FIG. 33 shows an example of the data configuration of a color sample database according to the seventh embodiment.

BEST MODE FOR CARRYING OUT THE INVENTION

Preferred embodiments of the present invention will now be described in detail in accordance with the accompanying drawings.

First Embodiment

Figure 1:
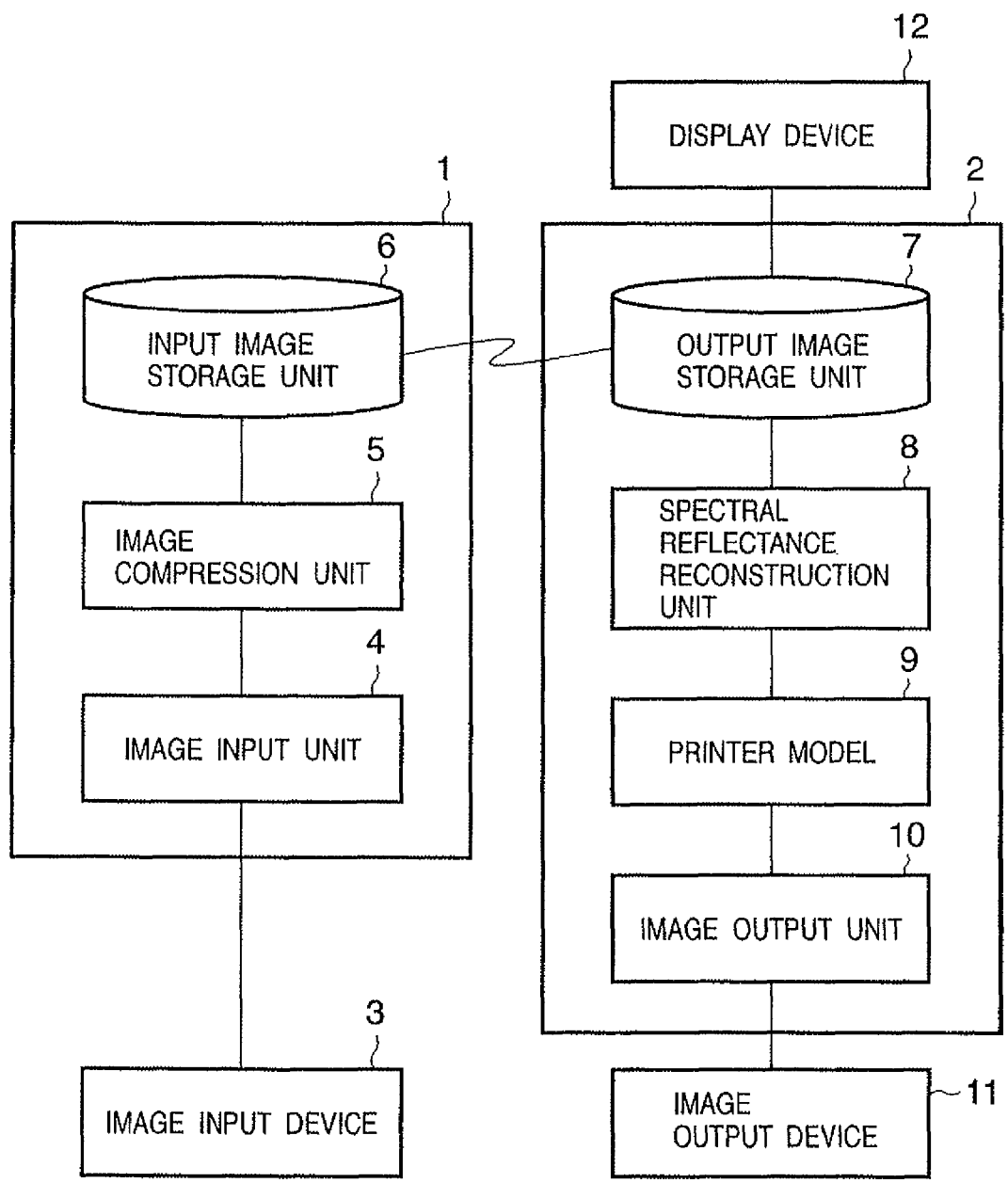
FIG. 1 is a block diagram showing the arrangement of a color reproduction apparatus according to the first embodiment.

FIG. 1 is a block diagram showing the arrangement of a color reproduction apparatus according to the first embodiment. The color reproduction apparatus of this embodiment is roughly comprised of an image input system 1 and image output system 2. Note that the image input system 1 and image output system 2 may be implemented by independent apparatuses or a single apparatus.

Reference numeral 3 denotes an image input device such as a multi-spectrum camera or the like, which inputs a spectral image of an object. In the image input system 1, reference numeral 4 denotes an image input unit which inputs a spectral image obtained by the image input device 3. Reference numeral 5 denotes an image compression unit which compresses the input spectral image into image data which contains R, G, and B data and information required for spectral reflectance reconstruction (in this embodiment, principal components up to a predetermined order (third order in this embodiment) obtained by principal component analysis). Reference numeral 6 denotes an input image storage unit which stores image data compressed by the image compression unit 5. In this embodiment, the spectral image means an image, all pixels of which are expressed by spectral distributions (reflectances at wavelengths from 380 to 780 nm in 10-nm increments). In general, an image is sensed using three different filters (R, G, and B values). The image input device 3 is a multi-band camera comprising six to eight filters, and can estimate respective spectral distributions corresponding to respective pixels of an object. Note that the image compression unit 5 converts the spectral image into R, G, and B images and reconstruction information common to all pixels, thus reducing (compressing) the data size. Note that the R, G, and B data may be further compressed by applying conversion such as JPEG or the like as a general image format to the R, G, and B data.

In the image output system 2, reference numeral 7 denotes an output image storage unit which loads and stores image data stored in the input image storage unit 6 in the image input system 1. If the image input system 1 and image output system 2 are formed using a single apparatus, the input image storage unit 6 and output image storage unit 7 need not be independently arranged. Reference numeral 8 denotes a spectral reflectance reconstruction unit which reconstructs spectral image data based on image data (which is compressed by the image compression unit 5) stored in the output image storage unit 7. Reference numeral 9 denotes a printer model which determines the ink dot quantity of each pixel for image reproduction on the basis of the reconstructed spectral reflectance. That is, the printer model 9 determines, for each pixel, an ink dot quantity with which the spectral reflectance of the print result is closest to the reconstructed spectral reflectance.

Reference numeral 10 denotes an image output unit which outputs print data for making an image output device 11 to make image formation using the ink dot quantities determined by the printer model 9.

Reference numeral 11 denotes an image output device such as a printer or the like, which outputs an image. In this embodiment and those to be described later, an ink-jet color printer is used as the image output device 11 to control the ink dot quantities upon image formation. However, various color printers can be applied as the image output device 11. For example, in case of a laser color printer, the ratio of mixing of color tones is controlled. Reference numeral 12 denotes a display device such as a CRT, LCD, or the like, which displays an image.

<Overall Process>

Figure 2:
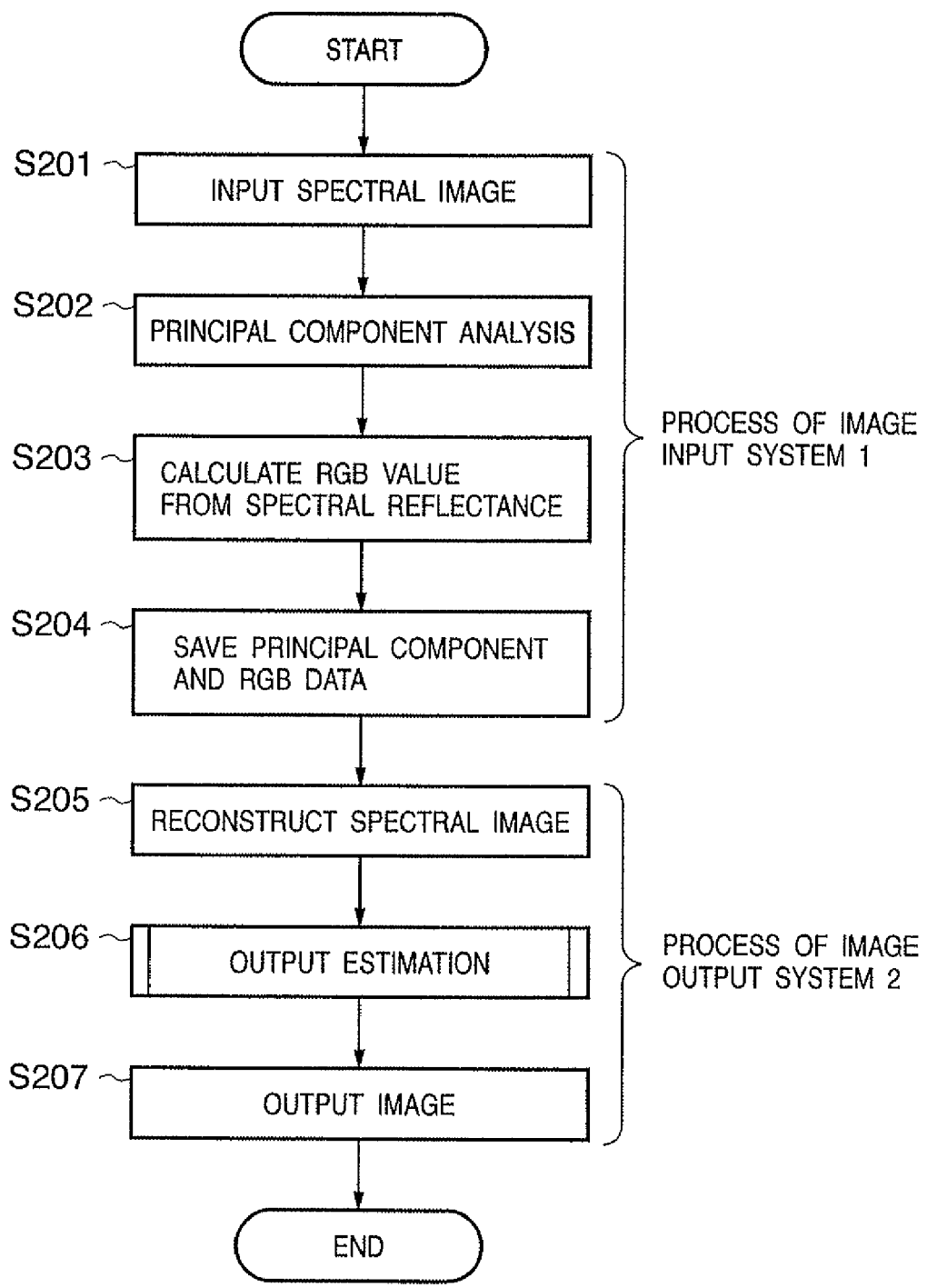
FIG. 2 is a flow chart for explaining a color reproduction process according to the first embodiment.
Figure 11:
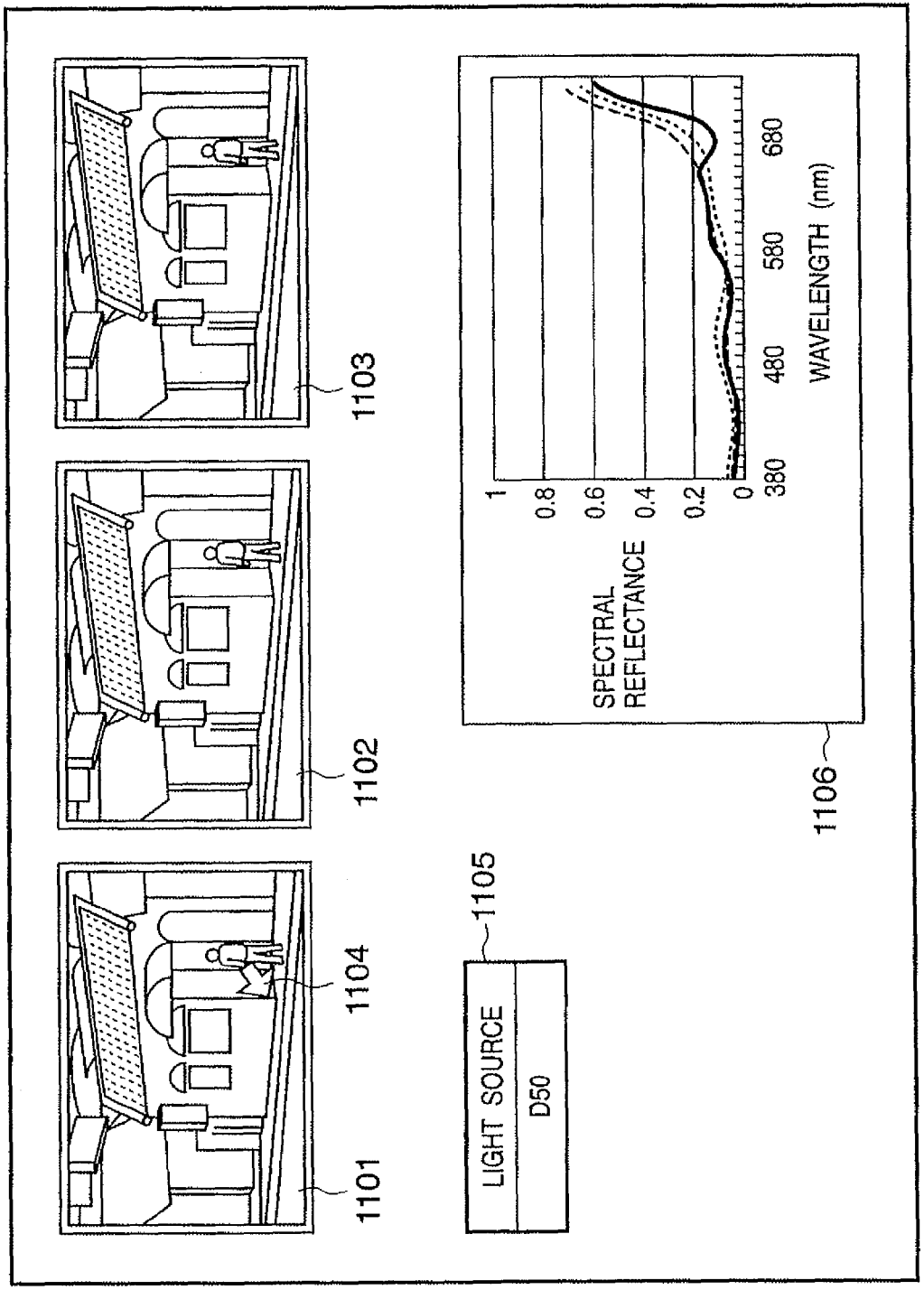
FIG. 11 shows an example of a user interface according to the first embodiment.
Figure 12:
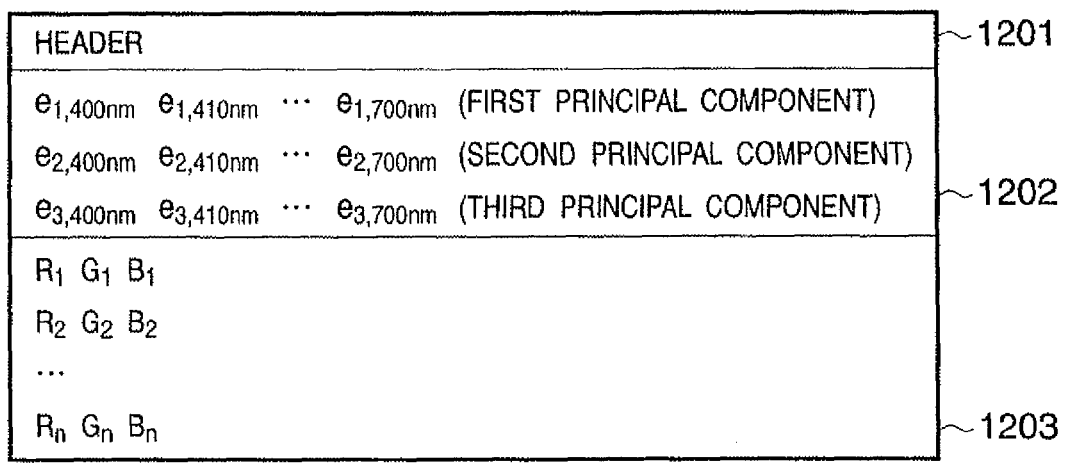
FIG. 12 shows an example of an image save format in the first embodiment.

The overall color reproduction process according to the first embodiment will be described below. FIG. 2 is a flow chart showing a color reproduction process executed by the image input system 1 and image output system 2. FIG. 11 shows an example of a user interface used upon color reproduction. FIG. 12 shows an example of the configuration of image data saved by the image input system 1 of the first embodiment.

In step S201, the image input unit 4 acquires a spectral image using the image input device 3. Tristimulus values X, Y, and Z, and the like are calculated from the acquired spectral image, and are further converted into device R, G, and B data for the display device 12 using, e.g., an ICC profile or the like. Based on the obtained R, G, and B data, an image is displayed on an original image display area 1101 (FIG. 11). At this time, if the user designates a pixel using a pixel designation pointer 1104, the spectral reflectance of the designated pixel is displayed on a spectral reflectance display area 1106 (indicated by the broken curve in FIG. 11). In this embodiment, an original image stored in the input image storage unit 6 is displayed on the display device 12 via the output image storage unit 7.

In step S202, the image compression unit 5 calculates principal components by making principal component analysis of the spectral reflectances of all pixels of the spectral image. In this embodiment, principal components up to the third order (third principal components) are calculated. Since the image input device 3 acquires a spectral image, it must be converted into spectral reflectance data using light source information in step S202. Normally, a multi-band camera acquires light source information using a standard white plate (when the standard white plate is photographed using the multi-band camera, the acquired spectral distribution corresponds to the product of those of the reference white plate and light source. Assuming that the standard white plate has reflectances=1 at all wavelengths, the acquired spectral distribution itself is that of the light source). More specifically, (Acquired image)=(spectral distribution of light source)×(spectral reflectance of standard white plate)

When both the sides are divided by (spectral reflectance of standard white plate)=1, we have:

(Acquired image)=(spectral distribution of light source)

The spectral reflectance that undergoes principal component analysis in step S202 is that (spectral reflectance itself) obtained by dividing the obtained spectral distribution by that of the light source.

In step S203, the image compression unit 5 calculates tristimulus values X, Y, and Z from the spectral reflectances of all pixels of the spectral image, and calculates R, G, and B values corresponding to the display device 12 using an ICC profile or the like. In step S204, the principal components up to the third order calculated in step S202, and R, G, and B values of respective pixels calculated in step S203 are stored in the input image storage unit 6 as image data (details of this process will be described later). The processes executed by the image input system 1 have been explained.

An image forming operation by the image output system 2 will be described below. In step S205, image data (FIG. 12) which is stored in the input image storage unit 6 and contains the principal components and R, G, and B data is loaded onto the output image storage unit 7. The spectral reflectance reconstruction unit 8 reconstructs spectral reflectances (details will be described later). At this time, the R, G, and B data can be directly displayed as an image on an image display area 1102 of the display device 12. Alternatively, tristimulus values X, Y, and Z may be calculated from the reconstructed spectral reflectances, and may be converted into device R, G, and B data of the display device 12 using light source information of user's choice at a light source selection area 1105, ICC profile, and the like, so as to display a color reproduction simulation result under an arbitrary light source on the display area 1102. If the user designates a pixel using the pixel designation pointer 1104, the spectral reflectance of the designated pixel is displayed on the spectral reflectance display area 1106 (indicated by the dotted curve in this embodiment).

In step S206, the printer model 9 determines ink dot quantities in the image output device 11 using the spectral reflectances reconstructed by the spectral reflectance reconstruction unit 8 as target colors. That is, the printer model 9 estimates a color (spectral reflectance) to be output by the printer (this estimation will be referred to as output estimation hereinafter; details of output estimation will be described later), and determines an ink dot quantity to minimize an error between the target color and the estimated output color (details will be described later).

At this time, tristimulus values X, Y, and Z are calculated from the estimated spectral reflectances using light source information of user's choice at the light source selection area 1105, and are converted into device R, G, and B data of the display device 12 using an ICC profile or the like, thus displaying an image on an output estimated image display area 1103 on the basis of the obtained R, G, and B values. When the user designates a desired pixel of the image displayed on the output estimated image display area 1103 using the pixel designation pointer 1104, the spectral reflectance display area 1106 displays the spectral reflectance of the designated pixel (indicated by the solid curve in this embodiment).

In step S207, the image output unit 10 drives and controls the image output device 11 using the ink dot quantities determined by the printer model 9, thus outputting an image.

<Image Save Format>

FIG. 12 shows an example of the image save format used upon storing image data in step S204. As shown in FIG. 12, principal components 1202 used in reconstruction are described between a header 1201 that describes information of, e.g., an image size, resolution, and the like, and R, G, and B data 1203 that indicate R, G, and B values of respective pixels of the image. In this embodiment, principal components up to the third order (first to third principal components) are recorded as the principal components 1202. Also, principal components of higher orders may be recorded. The principal components 1202 are obtained by making principal component analysis of the spectral distribution of pixels of the entire image, and the spectral reflectances of respective pixels are reconstructed from these principal components and R, G, and B data of respective pixels in spectral reflectance reconstruction in step S205. Note that the spectral reflectance used in principal component analysis is that (spectral reflectance itself) obtained by dividing the acquired spectral distribution by that of a light source, as has been explained in step S202.

<Spectral Reflectance Reconstruction>

Let $(X_{image}, Y_{image}, Z_{image})$ be tristimulus values obtained based on R, G, and B value of a given pixel in an image, and $(X_1, Y_1, Z_1)$, $(X_2, Y_2, Z_2)$, and $(X_3, Y_3, Z_3)$ be tristimulus values respectively calculated from the first, second, and third principal components held in the principal component field 1202. Then, we have:

$$X_{image} = k_1 X_1 + k_2 X_2 + k_3 X_3 \quad (1)$$

$$Y_{image} = k_1 Y_1 + k_2 Y_2 + k_3 Y_3 \quad (2)$$

$$Z_{image} = k_1 Z_1 + k_2 Z_2 + k_3 Z_3 \quad (3)$$

By solving simultaneous equations of equations (1) to (3) above, coefficients $k_1$, $k_2$, and $k_3$ are obtained. Using these coefficients, the spectral reflectance of the above pixel in the image is estimated by:

$$R(\lambda)_{image} = k_1 e_1(\lambda) + k_2 e_2(\lambda) + k_3 e_3(\lambda) \quad (4)$$

where $e_1(\lambda)$, $e_2(\lambda)$, and $e_3(\lambda)$; the first to third principal components Note that the tristimulus values $(X_{image}, Y_{image}, Z_{image})$ of a given pixel in the image are calculated in advance from R, G, and B values stored in the image data field 1203 using an ICC profile or the like. R, G, and B data held in the image data field 1203 are saved as device R, G, and B data of the display, sRGB data, or the like, since they are premised on display on the display. The ICC profile is used to accurately convert these R, G, and B values into X, Y, and Z values independently of any device. Also, the tristimulus values $(X_1, Y_1, Z_1)$, $(X_2, Y_2, Z_2)$, and $(X_3, Y_3, Z_3)$ of the first, second, and third principal components are calculated in advance using light source information of user's choice at the light source selection area 1105. Note that the aforementioned spectral reflectance reconstruction process is executed for respective pixels.

<Printer Output Estimation>

Figure 3:
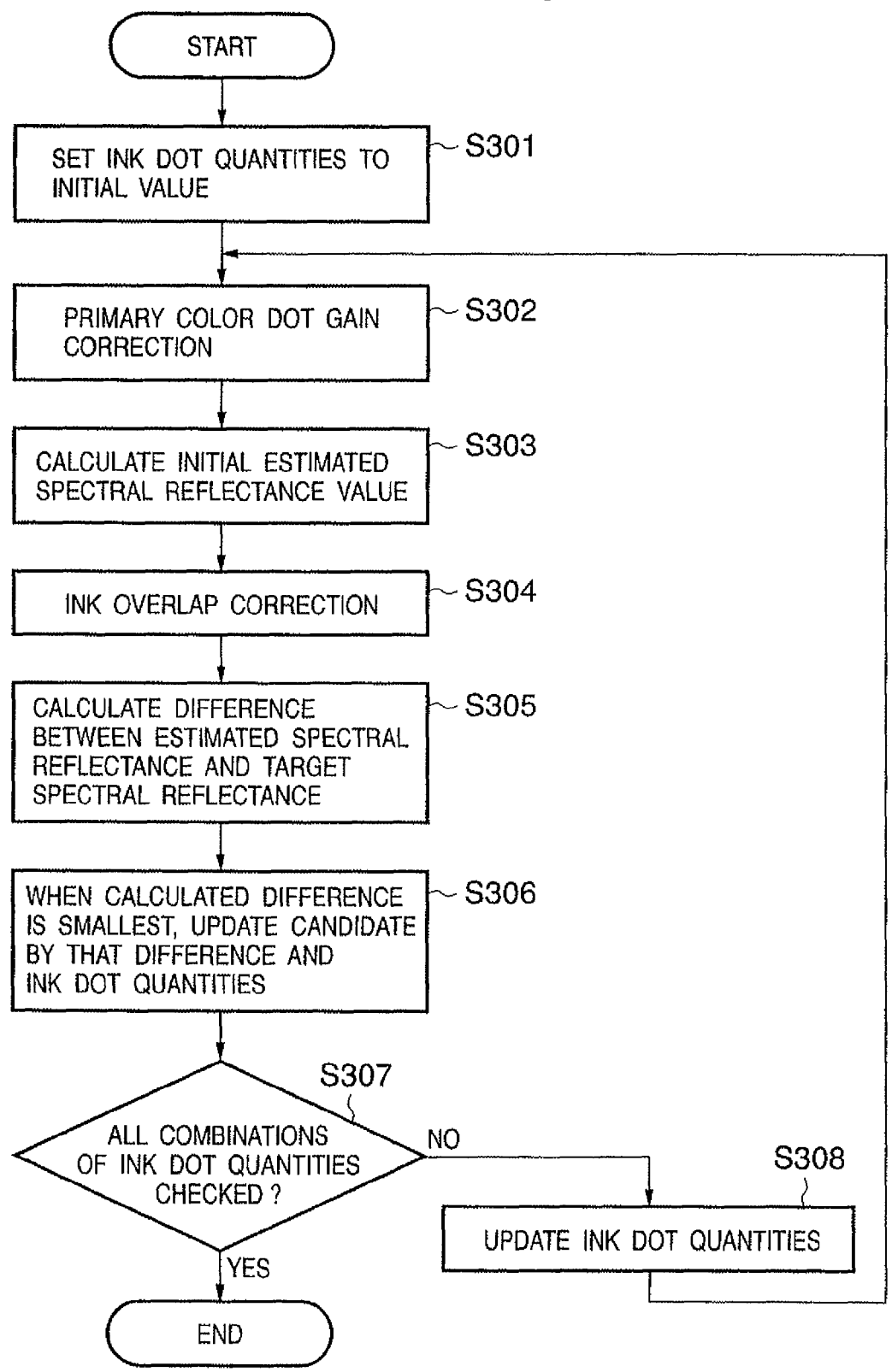
FIG. 3 is a flow chart for explaining an output estimation process.

The output estimation process in step S206 will be described below using FIG. 3. FIG. 3 is a flow chart for explaining the processing sequence of output estimation executed in step S206.

In step S301, all the dot quantities of inks to be adopted are set to be an initial values (e.g., 0%). In step S302, dot gain correction of primary colors is made (details will be described later). In step S303, using the spectral reflectances of inks that have undergone the primary color dot gain correction, an initial estimated spectral reflectance value $(R_{MIX,\lambda})$ of a multi-order color (mixed color) is calculated based on a KM theory (Kubelka-Munk theory) by:

$$\left(\frac{K}{S}\right)_{i,\lambda} = \frac{(R_{i,\lambda} - 1)^2}{(2 \cdot R_{i,\lambda})} \quad (5)$$

$$\left(\frac{K}{S}\right)_{MIX,\lambda} = \left(\frac{K}{S}\right)_{Paper,\lambda} + \sum_{i=1}^{n}\left(\frac{K}{S}\right)_{i,\lambda} \quad (6)$$

$$R_{MIX,\lambda} = 1 + \left(\frac{K}{S}\right)_{MIX,\lambda} - \sqrt{\left(\frac{K}{S}\right)_{MIX,\lambda}^2 + 2\cdot\left(\frac{K}{S}\right)_{MIX,\lambda}} \quad (7)$$

K: absorption coefficient
S: scattering coefficient $(K/S)_{i,\lambda}$: (K/S) of ink i at wavelength $\lambda$
$(K/S)_{MIX,\lambda}$: (K/S) at wavelength $\lambda$ after inks are mixed
$(K/S)_{paper,\lambda}$: (K/S) of paper at wavelength $\lambda$
$R_{i,\lambda}$: spectral reflectance of ink i at wavelength
$R_{MIX,\lambda}$: spectral reflectance at wavelength $\lambda$ after inks are mixed In step S304, the estimated spectral reflectance value calculated in step S303 undergoes ink overlap correction (details will be described later). In step S305, the difference between the estimated value of the spectral reflectance corrected in step S304 and a target spectral reflectance (the spectral reflectance calculated in step S205) is calculated (the calculation method will be described later). If it is determined in step S306 that the difference calculated in step S305 is smaller than a minimum difference held at that time, the minimum difference is updated by the calculated difference, and an ink dot quantity at that time is held.

It is checked in step S307 if all combinations (e.g., in 1%-increments from 0% to 100%) of the dot quantities of the inks used have undergone output estimation. If YES in step S4405, the process ends; otherwise, the flow advances to step S308. In step S308, the ink dot quantities are changed by a given amount (e.g., ink dot quantities of a given color are changed by 1% (alternatively, the increments of the change amount may be changed to 5%, 10%, or the like in accordance with the specification of a processing device used)), and the flow returns to step S302. In this manner, combinations of ink dot quantities that can minimize the differences from target values can be obtained.

<Primary Color Dot Gain Correction>

Figure 4:
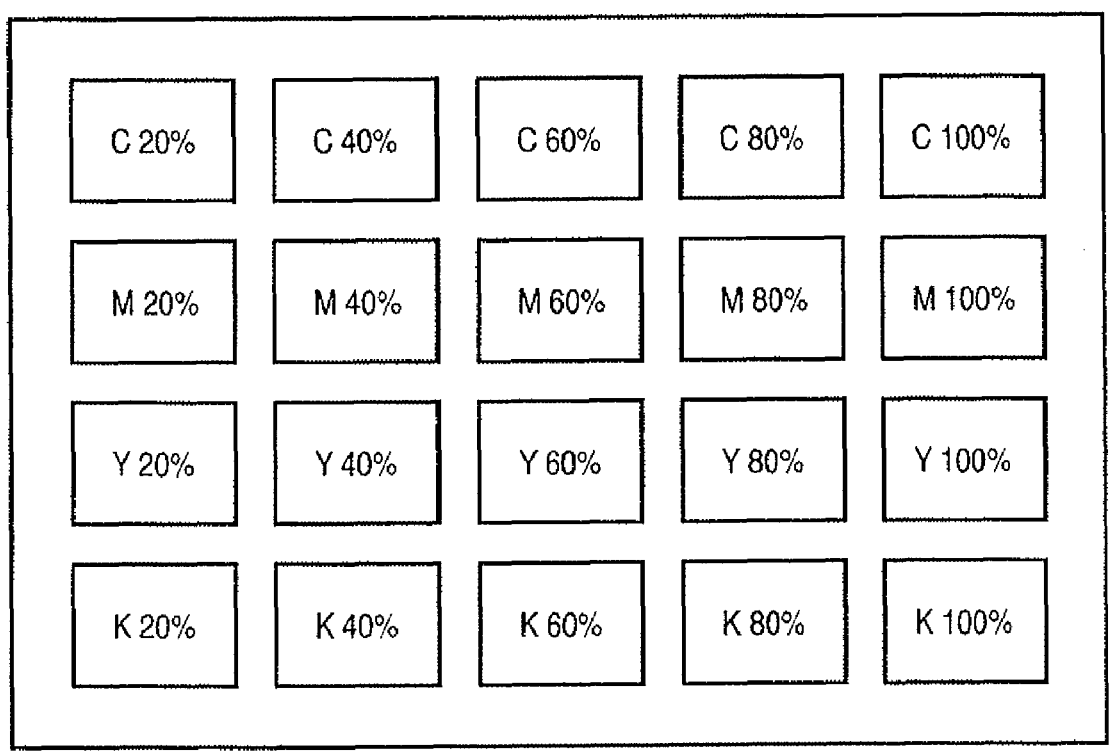
FIG. 4 shows an example of primary color correction patches.

Details of the primary color dot gain correction in step S302 will be described below using FIG. 4 and FIGS. 5A and 5B.

In general, it is assumed that the spectral reflectance (dot gain) of a primary color dot linearly changes with respect to a dot quantity. However, in this embodiment, primary color dot gain correction is made in consideration of the influence of nonlinearly of the dot gain. In this manner, more accurate reproduction color prediction can be made in consideration of the influence of nonlinearity of the dot gain in association with the spectral reflectance (dot gain) of a primary color dot.

In the primary color dot gain correction, a primary color dot gain correction LUT is generated in advance, and is searched using a combination of ink dot quantities set in step S301 or S308 for a primary color spectral reflectance corresponding to the dot quantities.

Upon generating the primary color dot gain correction LUT, primary color correction patches, which are output in advance using a printer (image output device 11) that is to undergo reproduction color prediction, are measured. The primary color correction patches used in this process are prepared by changing the ink dot quantity of each color in 20%-increments from 0% to 100%, as shown in FIG. 4.

Figure 5A:
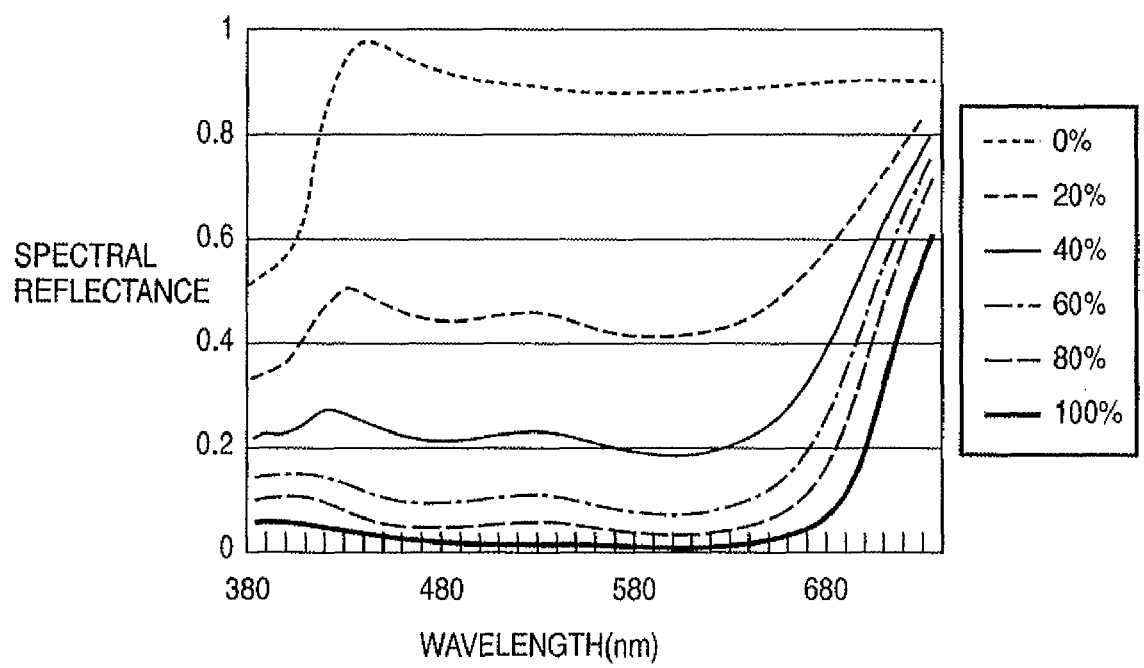
FIG. 5A is a graph showing the spectral reflectance measurement results in correspondence with the dot quantities of cyan ink.

The spectral reflectances obtained by measuring these primary color correction patches are reflectances at respective wavelengths corresponding to discrete ink dot quantities, as shown in FIG. 5A (FIG. 5A shows the spectral reflectances of cyan ink). FIG. 5A shows the spectral reflectance measurement results in correspondence with respective dot quantities (20%, 40%, 60%, 80%, 100%) of cyan ink. Also, the dot quantity=0% indicates an ink-less state, i.e., the spectral reflectance of paper.

Figure 5B:
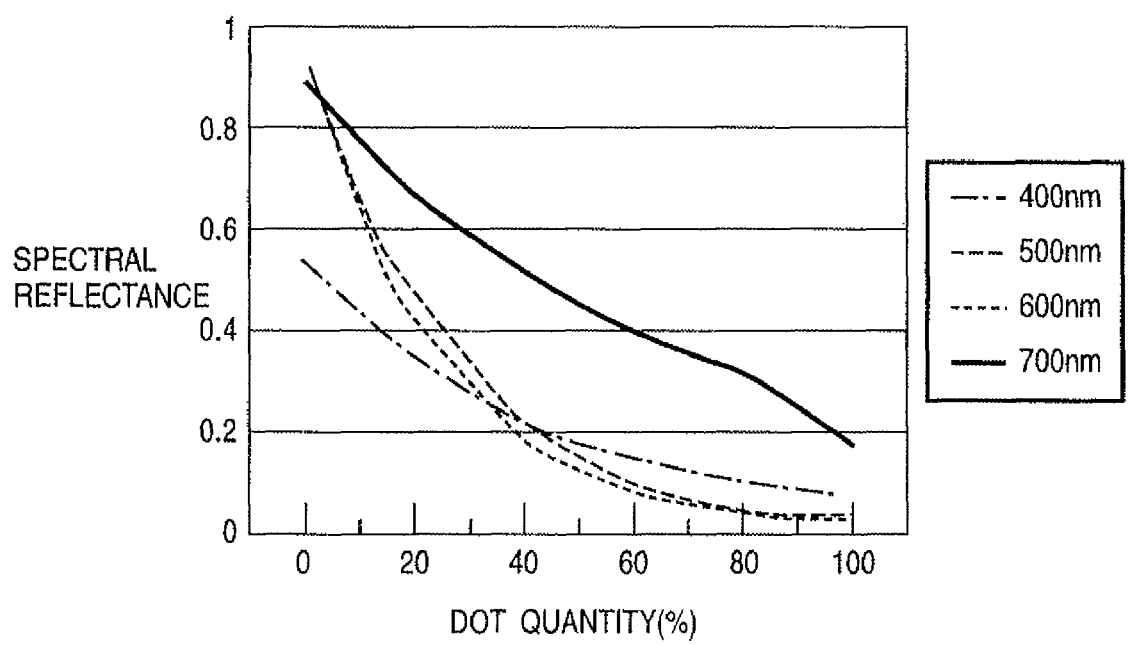
FIG. 5B is a graph showing a primary color correction LUT acquired from the measurement result shown in FIG. 5A.

Such spectral reflectance data are converted into an LUT which indicates the relationship between the dot quantities and reflectances at respective wavelengths of each ink, as shown in FIG. 5B. Since only discrete measurement results in 20%-increments of ink dot quantity are available, the primary color correction LUT is generated using a general interpolation method such as linear interpolation, spline interpolation, or the like. In the primary color dot gain correction (step S302), primary color dot gain correction is made in correspondence with the input ink dot quantities using this LUT to estimate spectral reflectances of primary colors. Note that FIG. 5B illustrates only four graphs for the sake of simplicity. However, in practice, tables of all wavelengths (41 wavelengths in 10-nm increments from 380 to 780 nm) sampled in the visible wavelength range are generated. Using such LUT, the spectral reflectance of the set ink dot quantity that has undergone the primary color dot gain correction can be acquired.

<Ink Overlap Correction>

Details of the ink overlap correction in step S304 will be described below.

In the ink overlap correction, ink overlap correction coefficients are calculated and stored in a predetermined storage device (not shown) prior to execution of the correction process. Using the correction coefficients and ink dot quantity, color reproduction prediction at that ink dot quantity is made.

Upon calculating the ink overlap correction coefficients, ink overlap correction patches, which are output in advance using a printer (image output device 11) that is to undergo reproduction color prediction, are measured. The ink overlap correction patches used in this process are prepared by changing the dot quantity of each ink in 20%-increments from 0% to 100%, and printing patches using two or more color inks to overlap each other.

Figure 6:
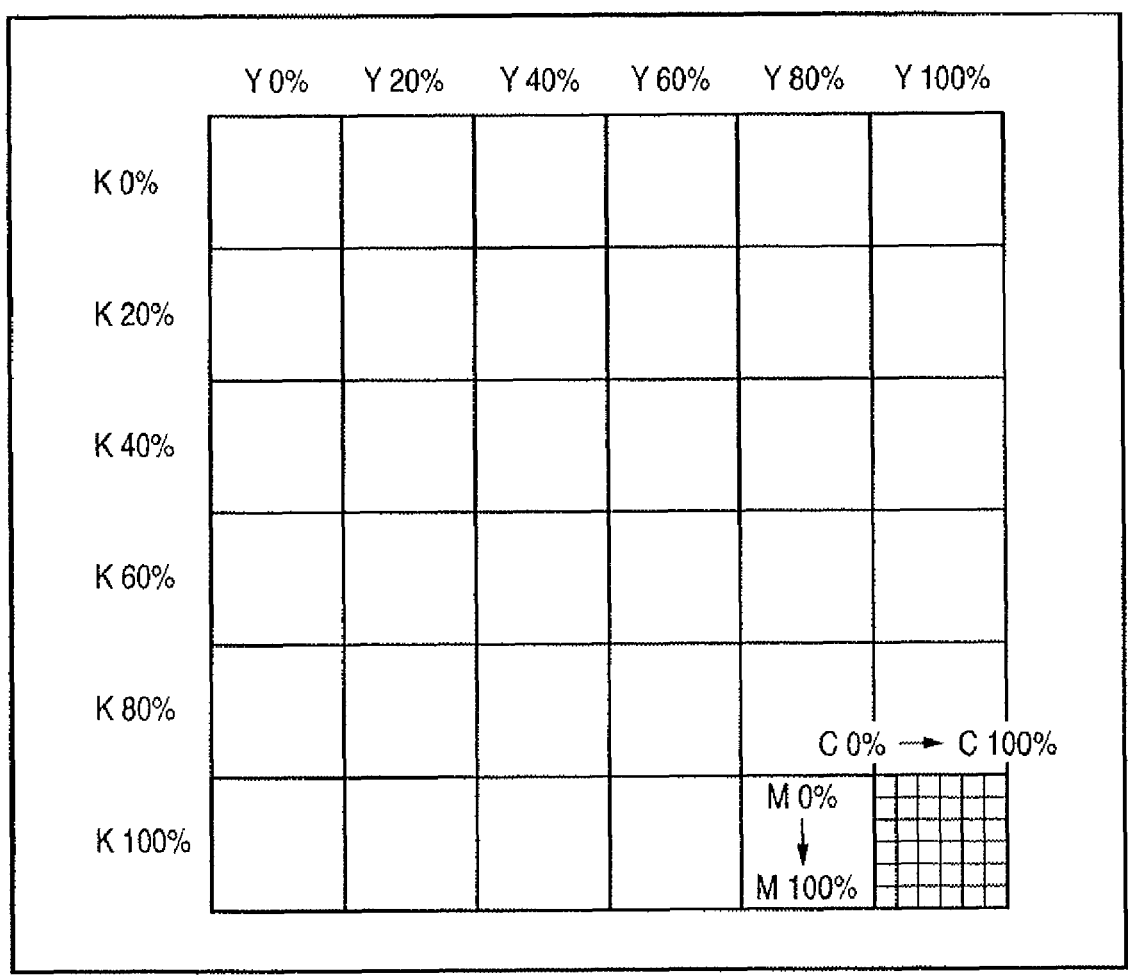
FIG. 6 shows an example of ink overlap correction patches.

The initial estimated spectral reflectance values of the overlap correction patches are estimated using data (respective color dot quantities of patches) used to record the overlap correction patches shown in FIG. 6, and equations (5) to (7) above (i.e., by executing the same processes as those in steps S302 and S303). The calculated initial estimated spectral reflectance values have errors from actually measured data. In order to correct errors from the actually measured data, correction coefficients $a_{h,\lambda}$, $b_{i,j,\lambda}$, and $c_{k,l,m,\lambda}$ are determined using a method of least squares or the like to minimize the errors by:

$$R_{mod,\lambda} = \sum_{h=1}^{n} a_{h,\lambda} R_{p,\lambda}^{h} + \sum_{\substack{i=1 \\ j=1}}^{n} b_{i,j,\lambda} \left(\frac{K}{S}\right)_{i,j,\lambda} + \sum_{\substack{k=1 \\ l=1 \\ m=1}}^{n} c_{k,l,m,\lambda} \left(\frac{K}{S}\right)_{k,l,m,\lambda} \quad (8)$$

$$\left(\frac{K}{S}\right)_{i,j,\lambda} = c_i \left(\frac{K}{S}\right)_{i,\lambda} + c_j \left(\frac{K}{S}\right)_{j,\lambda} \text{ for}$$

$$\left(\frac{K}{S}\right)_{k,l,m,\lambda} = c_k \left(\frac{K}{S}\right)_{k,\lambda} + c_l \left(\frac{K}{S}\right)_{l,\lambda} + c_m \left(\frac{K}{S}\right)_{m,\lambda}$$

$R_{mod,\lambda}$: corrected spectral reflectance at wavelength $\lambda$ $R_{p,\lambda}$: spectral reflectance at wavelength $\lambda$, which is estimated by the KM theory $a_{h,\lambda}$, $b_{i,j,\lambda}$, $c_{k,l,m,\lambda}$: ink overlap correction coefficients $(K/S)_{i,j,\lambda}$: (K/S) when only inks i and j at wavelength $\lambda$ are considered $(K/S)_{k,l,m,\lambda}$: (K/S) when only ink k, l, and m at wavelength $\lambda$ are considered $c_i$: dot quantity of ink i In equation (8), $R_{p,\lambda}$ an estimated value after primary color correction, which is calculated using the KM theory given by equations (5) to (7), and $R_{mod,\lambda}$ is a corrected estimated value after ink overlap correction. Coefficients $a_{h,\lambda}$, $b_{i,j,\lambda}$, and $c_{k,l,m,\lambda}$ are determined to minimize errors between $R_{mod,\lambda}$ and the actually measured values of color patches. Also, i and j of the second term, and k, l, and m of the third term indicate arbitrary inks. For example, if four, C, M, Y, and K colors are used as n-color inks, i=C, M, Y, K, j=C, M, Y, K, . . . (for i≠j, k≠l≠m). Furthermore, (K/S) is as defined by equation (5).

The correction coefficients which are determined in this way are stored in a predetermined storage device, and are read out upon executing the ink overlap correction in step S304. That is, in the ink overlap correction in step S304, the estimated spectral reflectance due to ink overlap is corrected by applying equation (8) to the initial estimated spectral reflectance value calculated in step S303 using the ink overlap correction coefficients.

<Error Calculation Method>

Details of the error calculation method in step S305 will be described below. As a method of calculating an error between two colors, a CIE color difference method is normally known. However, since the CIE color difference method does not consider any influence of metamerism, this embodiment uses a square mean (RMS error) of spectral distribution errors for respective wavelengths, which is, for example, given by:

$$\text{(RMS Error)} \sum_{\lambda=380\,nm}^{780\,nm} \sqrt{\frac{\{R(\lambda) - o(\lambda)\}^2}{n}} \quad (9)$$

However, the present invention is not limited to such specific calculation method as long as errors that consider metamerism (conditional color matching) can be calculated in addition to the RMS. For example, using a weighting function given by the sum of CIE color matching functions expressed by:

$$\bar{x}(\lambda), \bar{y}(\lambda), \bar{z}(\lambda)$$

in the RMS error like:

$$\text{(Weighted RMS Error)} \sum_{\lambda=380\,nm}^{780\,nm} \sqrt{\frac{\{R(\lambda) - o(\lambda)\}^2}{n}} \quad (10)$$

$$w(\lambda) = \bar{x}(\lambda) + \bar{y}(\lambda) + \bar{z}(\lambda)$$

errors which are weighted for respective wavelengths may be used.

As described above, according to this embodiment, the original spectral distribution characteristics of an input image are estimated using principal components obtained by applying principal component analysis to the spectral distributions of pixels of the entire image as data used to estimate the spectral distribution characteristics of an original scene of that image. Hence, the original spectral distribution characteristics can be faithfully reproduced.

In the above embodiment, the spectral distributions of all pixels of the image undergo principal component analysis. Alternatively, an image may be segmented into a plurality of regions, and each region may undergo principal component analysis to store principal components for respective regions. In this case, upon estimating the spectral reflectance of an arbitrary pixel, an arrangement that uses the principal components of a region to which that pixel belongs must be adopted. However, such arrangement is known to those who are skilled in the art.

Second Embodiment

In the first embodiment, the spectral distributions of pixels of the overall image undergo principal component analysis, and the analysis results (principal components 1 to 3) are held in correspondence with the image to be used upon reconstructing the spectral reflectances of the pixels. In the second embodiment, information for spectral reflectance reconstruction is held for each pixel. The second embodiment will be described in detail below with reference to the accompanying drawings.

Figure 7:
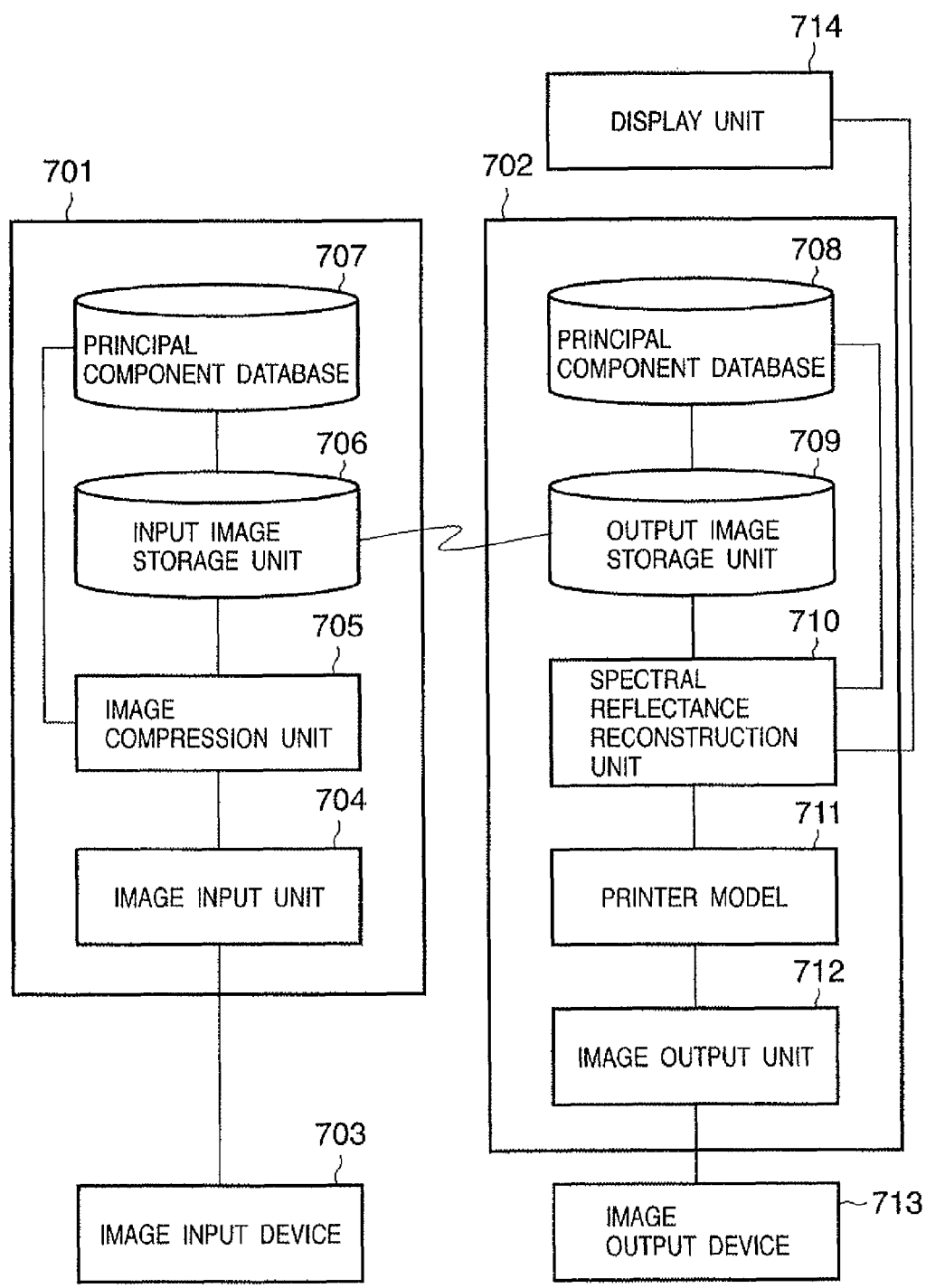
FIG. 7 is a block diagram showing the arrangement of a color reproduction apparatus according to the second embodiment.

FIG. 7 is a block diagram showing the arrangement of a color reproduction apparatus according to the second embodiment. Referring to FIG. 7, reference numeral 701 denotes an image input system; and 702, an image output system. Reference numeral 703 denotes an image input device such as a multi-spectrum camera or the like, which inputs a spectral image of an object.

In the image input system 701, reference numeral 704 denotes an image input unit which inputs a spectral image obtained by the image input device 703. Reference numeral 705 denotes an image compression unit which compresses the input spectral image into image data which contains R, G, and B data and information required for spectral reflectance reconstruction. Note that the R, G, and B data may be further compressed by applying conversion such as JPEG or the like as a general image format to the R, G, and B data. Reference numeral 706 denotes an input image storage unit which stores image data compressed by the image compression unit 705. Reference numeral 707 denotes a principal component database which stores categories of objects, and principal components corresponding to the categories. Note that examples of such categories include "flesh, sky, grass", and the like. As is known, their spectral distributions are very similar to each other for respective categories, and reconstruction with high accuracy can be implemented if it is done based on principal components.

In the image output system 702, reference numeral 708 denotes principal component database which stores categories of objects, and principal components corresponding to the categories. Note that this principal component database 708 and the principal component database 707 in the image input system 701 have the same contents. Reference numeral 709 denotes an output image storage unit which loads and stores image data stored in the input image storage unit 706 in the image input system 701. Reference numeral 710 denotes a spectral reflectance reconstruction unit which reconstructs spectral image data based on image data stored in the output image storage unit 709 with reference to the principal component database 708. Reference numeral 711 denotes a printer model which determines the ink dot quantity of each pixel for image reproduction on the basis of the reconstructed spectral reflectance. That is, the printer model 711 determines, for each pixel, an ink dot quantity with which the spectral reflectance of the print result is closest to the reconstructed spectral reflectance. Reference numeral 712 denotes an image output unit which outputs print data for making an image output device 713 to make image formation using the ink dot quantities determined by the printer model 711.

Reference numeral 713 denotes an image output device such as a printer or the like, which outputs an image. As described above, various kinds of color printers such as an ink-jet printer, laser beam printer, and the like can be applied as the image output device 713. Reference numeral 714 denotes a display device such as a CRT, LCD, or the like, which displays an image.

Note that the image input system 701 and image output system 702 may be implemented by independent apparatuses, as shown in FIG. 7, or by a single apparatus. When the image input system 701 and image output system 702 are implemented by a single apparatus, the input image storage unit 706 and output image storage unit 709, and the principal component databases 707 and 708 need not be independently arranged.

<Overall Process>

Figure 8:
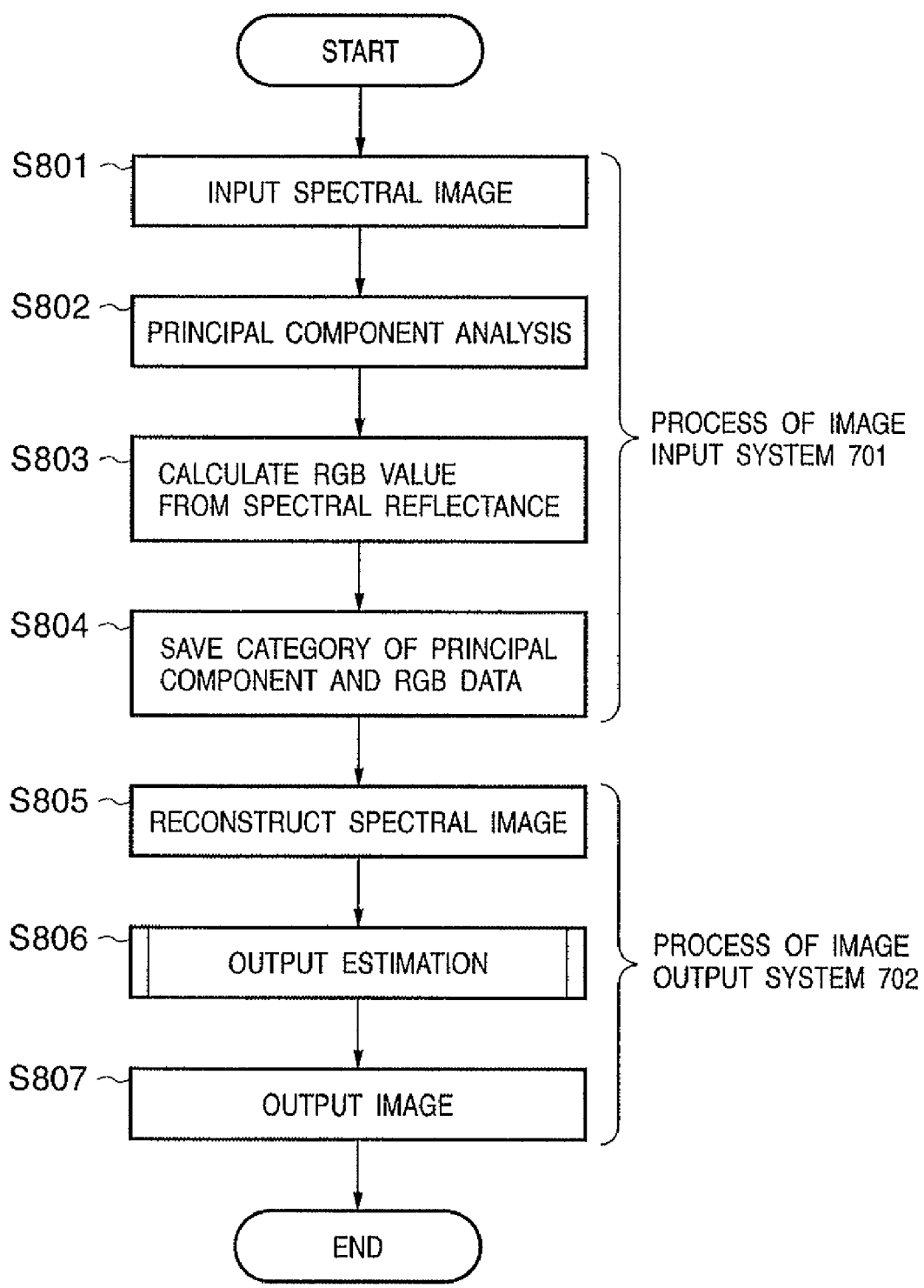
FIG. 8 is a flow chart for explaining a color reproduction process according to the second embodiment.
Figure 13:
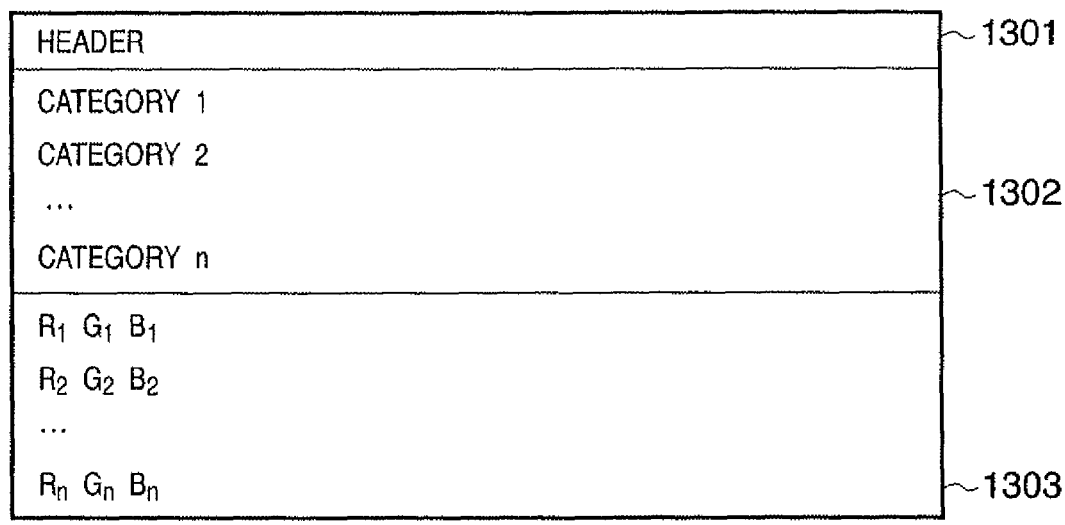
FIG. 13 shows an example of an image save format in the second embodiment.

A color reproduction process according to the second embodiment will be described in detail below. FIG. 8 is a flow chart of the color reproduction process executed by the input system 701 and output system 702. The user interface used upon color reproduction is the same as that in the first embodiment (FIG. 11), and a description will be given while diverting FIG. 11. FIG. 13 shows an example of the configuration of image data saved by the image input system 701 of the second embodiment.

In step S801, the image input unit 704 acquires a spectral image using the image input device 703. Tristimulus values X, Y, and Z, and the like are calculated from the acquired spectral image, and are further converted into device R, G, and B data for the display device 714 using, e.g., an ICC profile or the like, thus displaying an image on the original image display area 1101 (FIG. 11). At this time, if the user designates a pixel using the pixel designation pointer 1104, the spectral reflectance of the designated pixel is displayed on the spectral reflectance display area 1106 (indicated by the broken curve).

In step S802, the image compression unit 705 calculates principal components by making principal component analysis of the spectral reflectances of all pixels of the spectral image. The calculated principal components are compared with principal component data stored in the principal component database 707 to determine a principal component category with the smallest error as that of the pixel of interest. Note that the error calculation method is not limited to a specific method. For example, the least square means of respective principal components (between first principal components, second principal components, ..., of the image and database) may be calculated.

In step S803, the image compression unit 705 calculates tristimulus values X, Y, and Z from the spectral reflectances of all pixels of the spectral image, and calculates R, G, and B values using an ICC profile or the like. In step S804, the categories of respective pixels calculated in step S802, and R, G, and B values of respective pixels calculated in step S803 are stored in the input image storage unit 706, as shown in FIG. 13 (details of this process will be described later). The processes executed by the image input system 701 have been explained.

Processes of the image output system 702 will be described below. In step S805, R, G, and B data stored in the input image storage unit 706 are loaded onto the output image storage unit 709. The spectral reflectance reconstruction unit 710 reconstructs spectral reflectances as in the first embodiment. Note that the second embodiment uses principal components, which are saved in the output principal component database 708 and belong to categories corresponding to pixels. Note that the input and output principal component databases 707 and 708 store identical principal components and categories.

At this time, the R, G, and B data can be directly displayed as an image on the image display area 1102 of the display device 714. Alternatively, tristimulus values X, Y, and Z may be calculated from the spectral reflectances reconstructed in step S805, and may be converted into device R, G, and B data of the display device 714 using light source information of user's choice at the light source selection area 1105, ICC profile, and the like, so as to simulate color reproduction under an arbitrary light source and to display that simulation result on the area 1102. If the user designates a pixel using the pixel designation pointer 1104, the spectral reflectance of the designated pixel is displayed on the spectral reflectance display area 1106 (indicated by the dotted curve in this embodiment).

In step S806, the printer model 711 determines ink dot quantities in the image output device 713 using the spectral reflectances reconstructed by the spectral reflectance reconstruction unit 710 as target colors, as in step S206 of the first embodiment. That is, the printer model 711 estimates a color (spectral reflectance) to be output by the printer (output estimation), and determines an ink dot quantity to minimize an error between the target color and the estimated output color (details will be described later).

Tristimulus values X, Y, and Z are calculated from the spectral reflectances obtained by the aforementioned output estimation and light source information of user's choice at the light source selection area 1105, and are converted into device R, G, and B data of the display device 714 using an ICC profile or the like, thus displaying the conversion result on the output estimated image display area 1103. When the user designates a pixel of the image displayed on the output estimated image display area 1103 using the pixel designation pointer 1104, the spectral reflectance display area 1106 displays the spectral reflectance of the designated pixel (indicated by the solid curve in this embodiment).

In step S807, the image output unit 712 controls the image output device 713 to output an image using the ink dot quantities determined by the printer model 711.

<Image Save Format>

FIG. 13 shows an example of the image save format used upon storing image data in step S804. As shown in FIG. 13, categories 1302 for respective pixels are described between a header 1301 and R, G, and B data 1303. The spectral reflectance reconstruction unit 710 acquires principal components corresponding to the categories of respective pixels stored in the category field 1302 from the principal component database 708, and reconstructs spectral reflectances on the basis of the acquired principal components and R, G, and B data of respective pixels stored in the RGB data field 1303.

Using the spectral reflectances reconstructed in this way, color reproduction is made by the same method as that described in the first embodiment.

As described above, according to the second embodiment, since principal components can be given for respective pixels, the spectral reflectances can be reconstructed more accurately.

Third Embodiment

In the first and second embodiments, the principal component analysis result is used in spectral reflectance reconstruction. However, the present invention is not limited to this. In the third embodiment, system characteristics are used in spectral reflectance reconstruction. For example, since a general RGB image acquisition device (digital camera, scanner, or the like) determines R, G, and B output values corresponding to the spectral distribution on the basis of the spectral transmittances of R, G, and B filters and the characteristics of an image sensing element (CCD or the like), $R(\lambda) \times S(\lambda)$, $G(\lambda) \times S(\lambda)$, $B(\lambda) \times S(\lambda)$, and the like may be used as the system characteristics of this embodiment. Note that $R(\lambda)$, $G(\lambda)$, and $B(\lambda)$ are the spectral transmittances of the R, G, and B filters, and $S(\lambda)$ is the spectral characteristics of the CCD. Also, it is a common practice to set $\lambda$ increments to be 5- or 10-nm increments. However, the $\lambda$ increments may be changed in consideration of the balance between the precision and cost performance, and the increments of wavelength $\lambda$ is not particularly limited in this embodiment.

Figure 9:
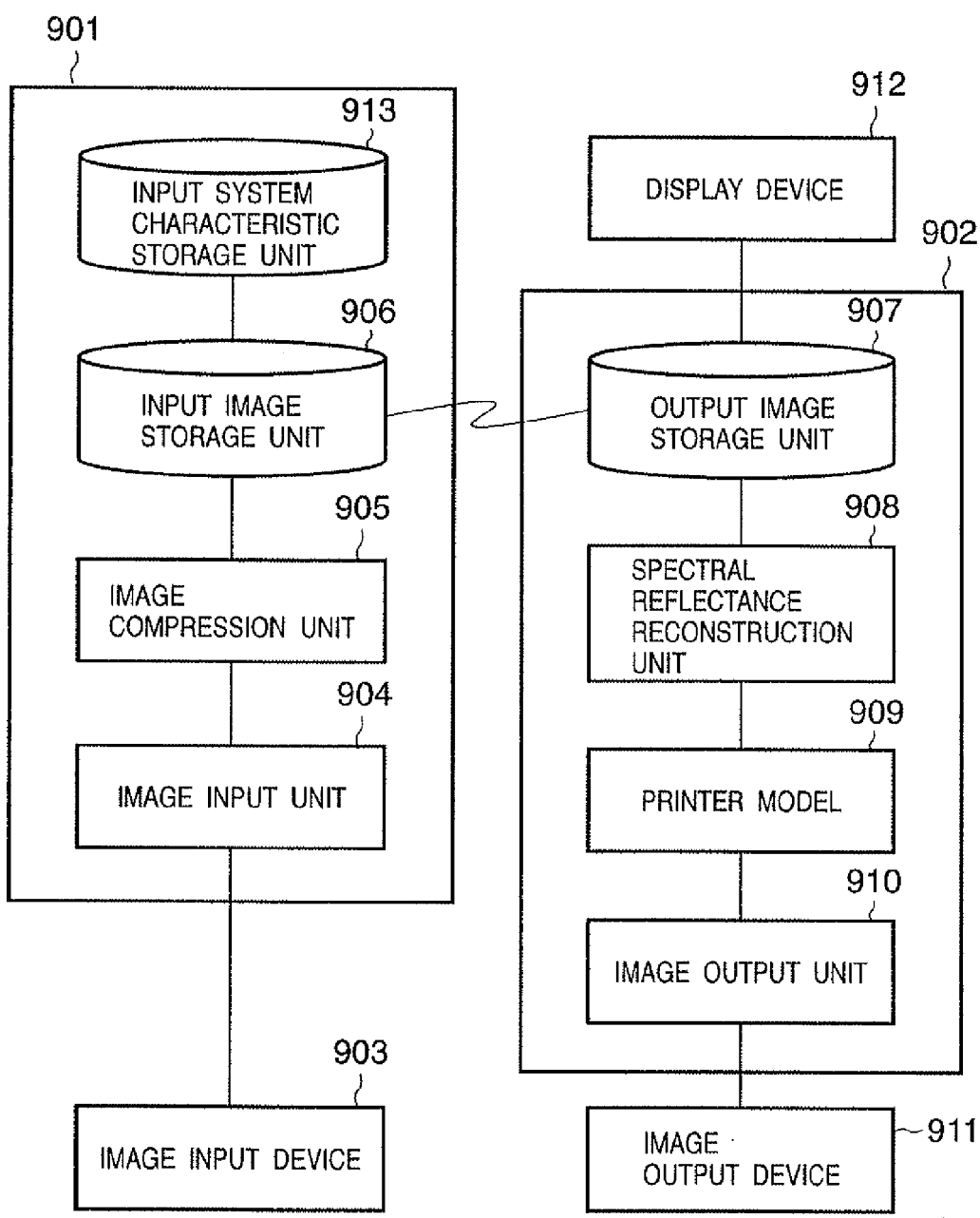
FIG. 9 is a block diagram showing the arrangement of a color reproduction apparatus according to the third embodiment.

FIG. 9 is a block diagram showing the arrangement of a color reproduction apparatus according to the third embodiment. Referring to FIG. 9, reference numeral 901 denotes an image input system; and 902, an image output system. Reference numeral 903 denotes an image input device such as a CCD, CMOS, or the like, which inputs an RGB image.

In the image input system 901, reference numeral 904 denotes an image input unit which inputs the RGB image from the image input device 903. Reference numeral 905 denotes an image compression unit which compresses the RGB image input by the image input unit 904. Reference numeral 906 denotes an input image storage unit, which stores the image data compressed by the image compression unit 905. Reference numeral 913 denotes an input system characteristic storage unit, which stores the system characteristics of the input system 901. Note that the image compression unit 905 executes a process for appending system characteristics (header field) to R, G, and B data, since it receives the R, G, and B data as inputs. Note that the R, G, and B data may be further compressed by applying conversion such as JPEG or the like as a general image format to the R, G, and B data.

Reference numeral 907 denotes an output image storage unit which loads and stores image data stored in the input image storage unit 906 in the image input system 901. Reference numeral 908 denotes a spectral reflectance reconstruction unit which reconstructs spectral image data based on image data stored in the output image storage unit 907. Reference numeral 909 denotes a printer model which determines an ink dot quantity of each pixel for image reproduction on the basis of the reconstructed spectral reflectance. That is, the printer model 909 determines, for each pixel, an ink dot quantity with which the spectral reflectance of the print result is closest to the reconstructed spectral reflectance. Reference numeral 910 denotes an image output unit which outputs print data for making an image output device 911 to make image formation using the ink dot quantities determined by the printer model 909.

Reference numeral 911 denotes an image output device such as a printer or the like, which outputs an image. As has been explained in the first embodiment, various kinds of color printers such as an ink-jet printer, laser beam printer, and the like can be applied as the image output device 911. Reference numeral 912 denotes a display device such as a CRT, LCD, or the like, which displays an image.

Note that the image input system 901 and image output system 902 may be implemented by independent apparatuses, as shown in FIG. 9, or by a single apparatus. When the image input system 901 and image output system 902 are implemented by a single apparatus, the input image storage unit 906 and output image storage unit 907 need not be independently arranged.

<Overall Process>

Figure 10:
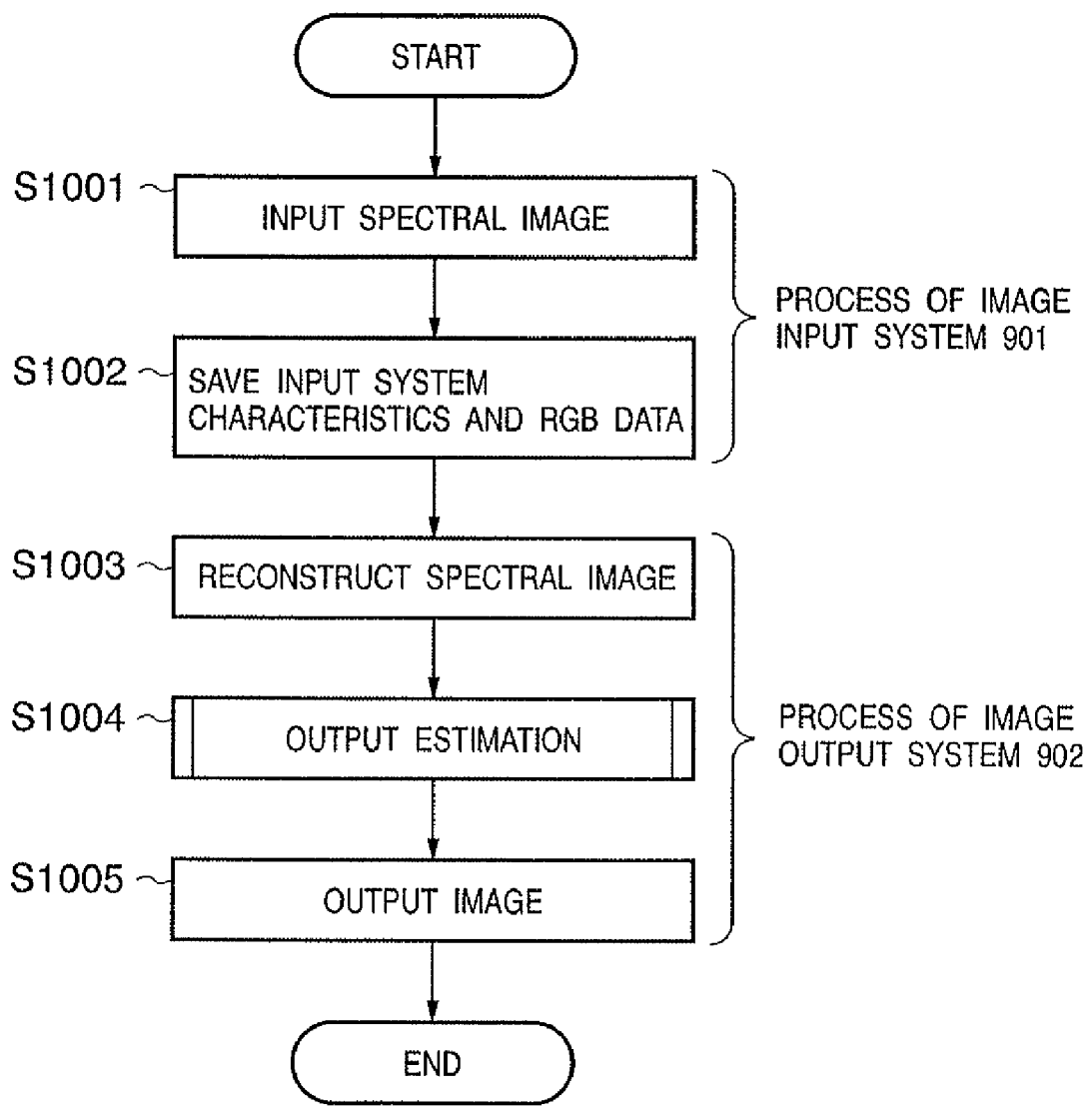
FIG. 10 is a flow chart for explaining a color reproduction process according to the third embodiment.

A color reproduction process according to the third embodiment will be described in detail below with reference to the accompanying drawings. FIG. 10 is a flow chart of the color reproduction process executed by the input system 901 and output system 902. The user interface used upon color reproduction is the same as that in the first embodiment (FIG. 11), and a description will be given while diverting FIG. 11. FIG. 14 shows an example of the configuration of image data saved by the image input system 901 of the third embodiment.

In step S1001, the image input unit 904 acquires an RGB image using the image input device 903. At this time, the acquired RGB image is displayed on the original image display area 1101.

In step S1002, the image compression unit 905 stores the acquired RGB image and the input system characteristics stored in the input system characteristic storage unit 913 in the input image storage unit 906 in the data configuration shown in FIG. 14 (details will be described later). The processes executed by the image input system 901 have been explained.

Processes of the image output system 902 will be described below. In step S1003, image data stored in the input image storage unit 906 in the format shown in FIG. 14 is loaded, and is stored in the output image storage unit 907. That is, image data R, G, and B, and system characteristics ($S_{R1(\lambda)}$, $S_{G1(\lambda)}$, $S_{G1(\lambda)}$), ($S_{R2(\lambda)}$, $S_{G2(\lambda)}$, $S_{G2(\lambda)}$), and ($S_{R3(\lambda)}$, $S_{G3(\lambda)}$, $S_{G3(\lambda)}$) stored in the input image storage unit 906 are loaded onto the output image storage unit 907. The spectral reflectance reconstruction unit 908 reconstructs spectral reflectances on the basis of the loaded information (details will be described later).

At this time, the loaded R, G, and B data can be directly displayed as an image on the image display area 1102 of the display device 912. Alternatively, tristimulus values X, Y, and Z may be calculated from the reconstructed spectral reflectances, and may be converted into device R, G, and B data of the display device 912 using light source information of user's choice at the light source selection area 1105, ICC profile, and the like, so as to simulate color reproduction under an arbitrary light source and to display that simulation result on the area 1102. If the user designates a pixel using the pixel designation pointer 1104, the spectral reflectance of the designated pixel is displayed on the spectral reflectance display area 1106 (indicated by the dotted curve in this embodiment).

In step S1004, the printer model 909 determines ink dot quantities in the image output device 911 using the spectral reflectances reconstructed by the spectral reflectance reconstruction unit 908 as target colors, as in step S206 of the first embodiment. That is, the printer model 909 estimates a color (spectral reflectance) to be output by the printer (output estimation), and determines an ink dot quantity to minimize an error between the target color and the estimated output color.

Tristimulus values X, Y, and Z are calculated from the estimated spectral reflectances using light source information of user's choice at the light source selection area 1105, and are converted into device R, G, and B data of the display device 912 using an ICC profile or the like, thus displaying an image on the output estimated image display area 1103. When the user designates a pixel of the image displayed on the output estimated image display area 1103 using the pixel designation pointer 1104, the spectral reflectance display area 1106 displays the spectral reflectance of the designated pixel (indicated by the solid curve in this embodiment).

In step S1005, the image output unit 910 controls the image output device 911 to output an image using the ink dot quantities determined by the printer model 909.

<Image Save Format>

FIG. 14 shows an example of the image save format used upon storing image data in step S1002. As shown in FIG. 14, system characteristics 1402 of the image input system are described between a header 1401 and R, G, and B data 1403. The spectral reflectance reconstruction unit 908 reconstructs spectral reflectances on the basis of these R, G, and B data and system characteristics.

<Spectral Reflectance Reconstruction>

Let ($R_{image}$, $G_{image}$, $B_{image}$) be the R, G, and B values of a pixel in an image, and ($S_{R1(\lambda)}$, $S_{G1(\lambda)}$, $S_{B1(\lambda)}$), ($S_{R2(\lambda)}$, $S_{G2(\lambda)}$, $S_{B2(\lambda)}$), and ($S_{R3(\lambda)}$, $S_{G3(\lambda)}$, $S_{B3(\lambda)}$) be the system characteristics of the input system. Then, the spectral reflectance of the pixel in the image is estimated by:

$$R(\lambda)_{image} = R_{image}(S_{R1}(\lambda) + S_{R2}(\lambda) + S_{R3}(\lambda)) + \quad (11)$$

$$G_{image}(S_{G1}(\lambda) + S_{G2}(\lambda) + S_{G3}(\lambda)) +$$

$$B_{image}(S_{B1}(\lambda) + S_{B2}(\lambda) + S_{B3}(\lambda))$$

Using the spectral reflectances obtained by equation (11) above, color reproduction is made by the same method as that described in the first embodiment.

According to the embodiments mentioned above, data used to estimate original spectral distribution characteristics of an input image is appended to image data, and a color conversion process that converts an input image signal into an output image signal estimates the spectral reflectance characteristics of an original scene on the basis of the appended data. For this reason, the spectral reflectance characteristics can be faithfully reproduced, and accurate color reproduction of an original scene of an image can be realized even in different observation environments.

Another Embodiment

<Output Estimation>

In each of the above embodiments, the output estimation in the printer model 5, 815, or 909 may use various other schemes in addition to the aforementioned output estimation method. For example, a conventional output estimation method based on a neural network may be used, or the Neugebauer equation using the Yule-Nielsen correction equation may be used. That is, the output estimation method is not particularly limited as long as it can predict an output using ink spectral reflectance data and dot quantities.

As described above, according to the first to third embodiments, the spectral distribution characteristics of an input image can be estimated, and can be faithfully reproduced in an output image. For this reason, an image output that can realize faithful color reproduction can be obtained even in different observation environments.

Fourth Embodiment

Figure 15:
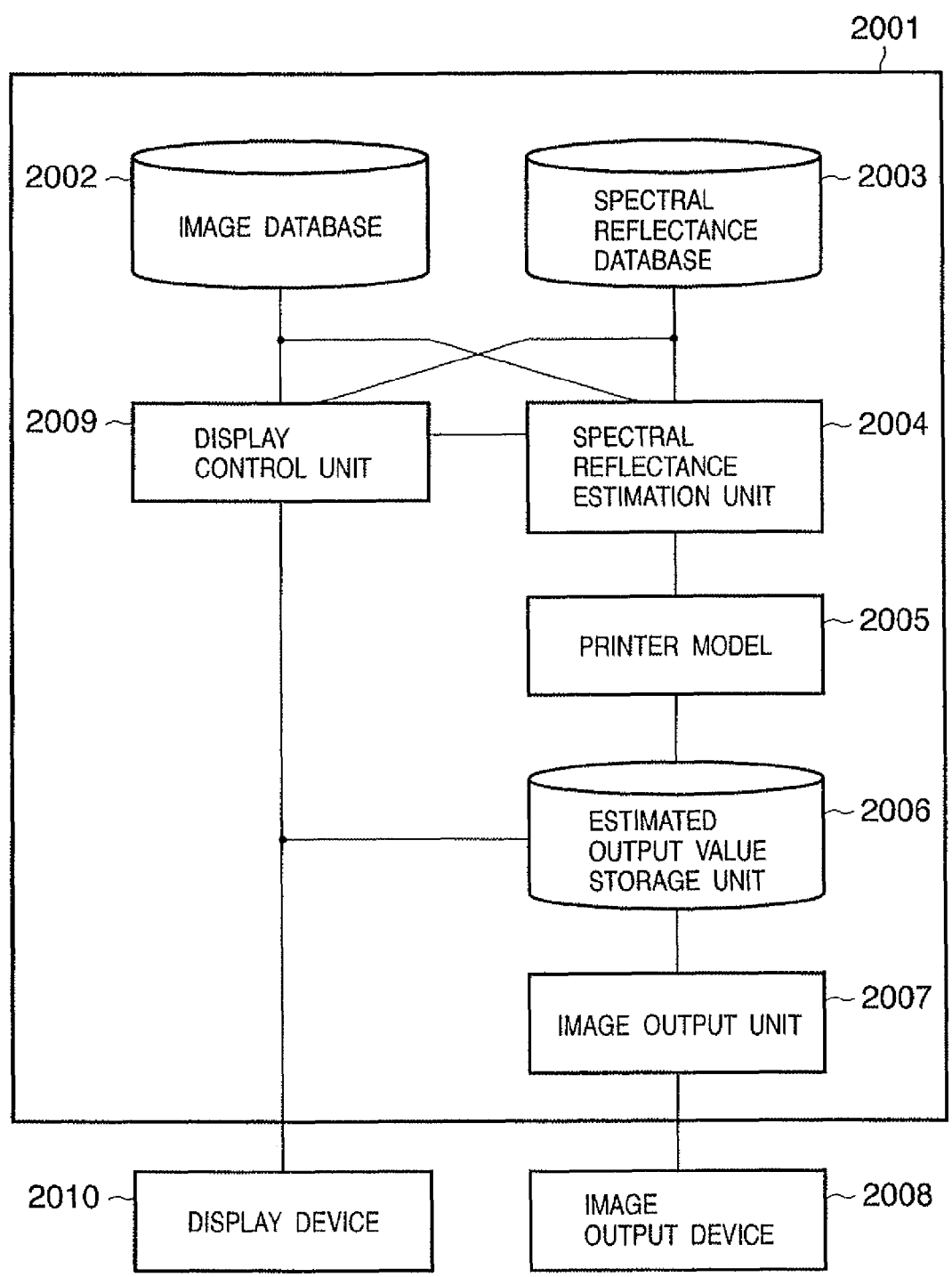
FIG. 15 is a block diagram showing the arrangement of a color reproduction apparatus according to the fourth embodiment.

FIG. 15 is a block diagram showing the arrangement of a color reproduction apparatus according to the fourth embodiment. Referring to FIG. 15, reference numeral 2001 denotes a color reproduction apparatus of the fourth embodiment. Reference numeral 2002 denotes an image database which stores image data to be output by an image output device 2008. Note that image data stored in the image database 2002 is data that expresses an image on an RGB space. Reference numeral 2003 denotes a spectral reflectance database which stores spectral reflectance data corresponding to respective combinations of tristimulus values. Reference numeral 2004 denotes a spectral reflectance estimation unit, which estimates a spectral reflectance from R, G, and B values of an image selected from the image database 2002 using the spectral reflectance database 2003.

In the fourth embodiment, the spectral reflectance database 2003 is not limited to initial setups, and may additionally store data measured by the user, and the like.

Reference numeral 2005 denotes a printer model which estimates the spectral reflectance of a recording result of the image output device 2008. Reference numeral 2006 denotes an estimated output value storage unit which stores the estimated output value estimated by the printer model 2005. Reference numeral 2007 denotes an image output unit, which outputs image data that makes the image output device 2008 output an image. Reference numeral 2008 denotes an image output device which includes a printer based on a laser beam system, ink-jet system, or the like, and outputs an image. Reference numeral 2009 denotes a display control unit which controls display on a display device 2010. Reference numeral 2010 denotes a display device which comprises a CRT or LCD, and displays various processing results under the display control of the display control unit 2009.

<Overall Process>

Figure 16:
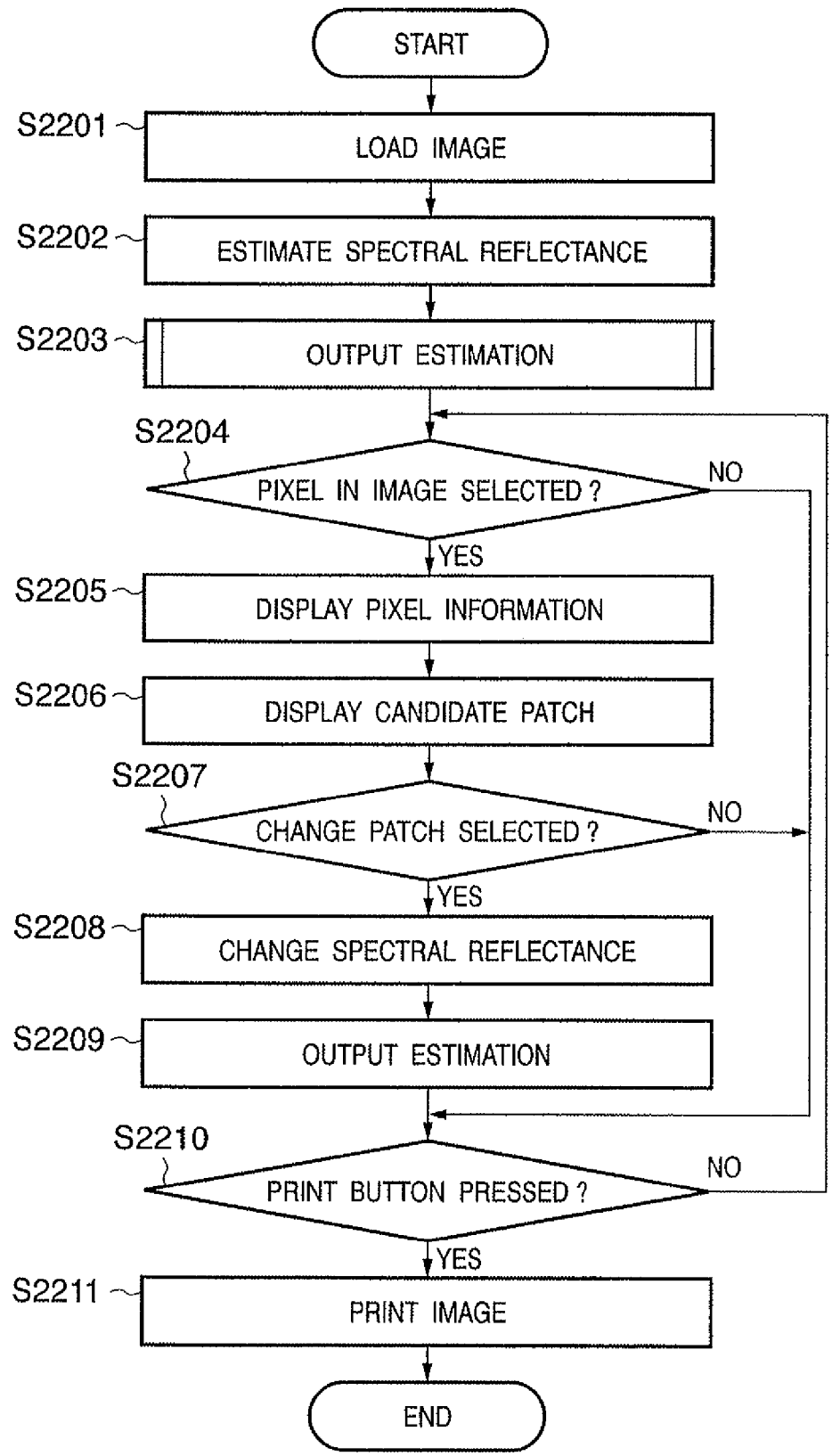
FIG. 16 is a flow chart for explaining a color reproduction process according to the fourth embodiment.
Figure 17:
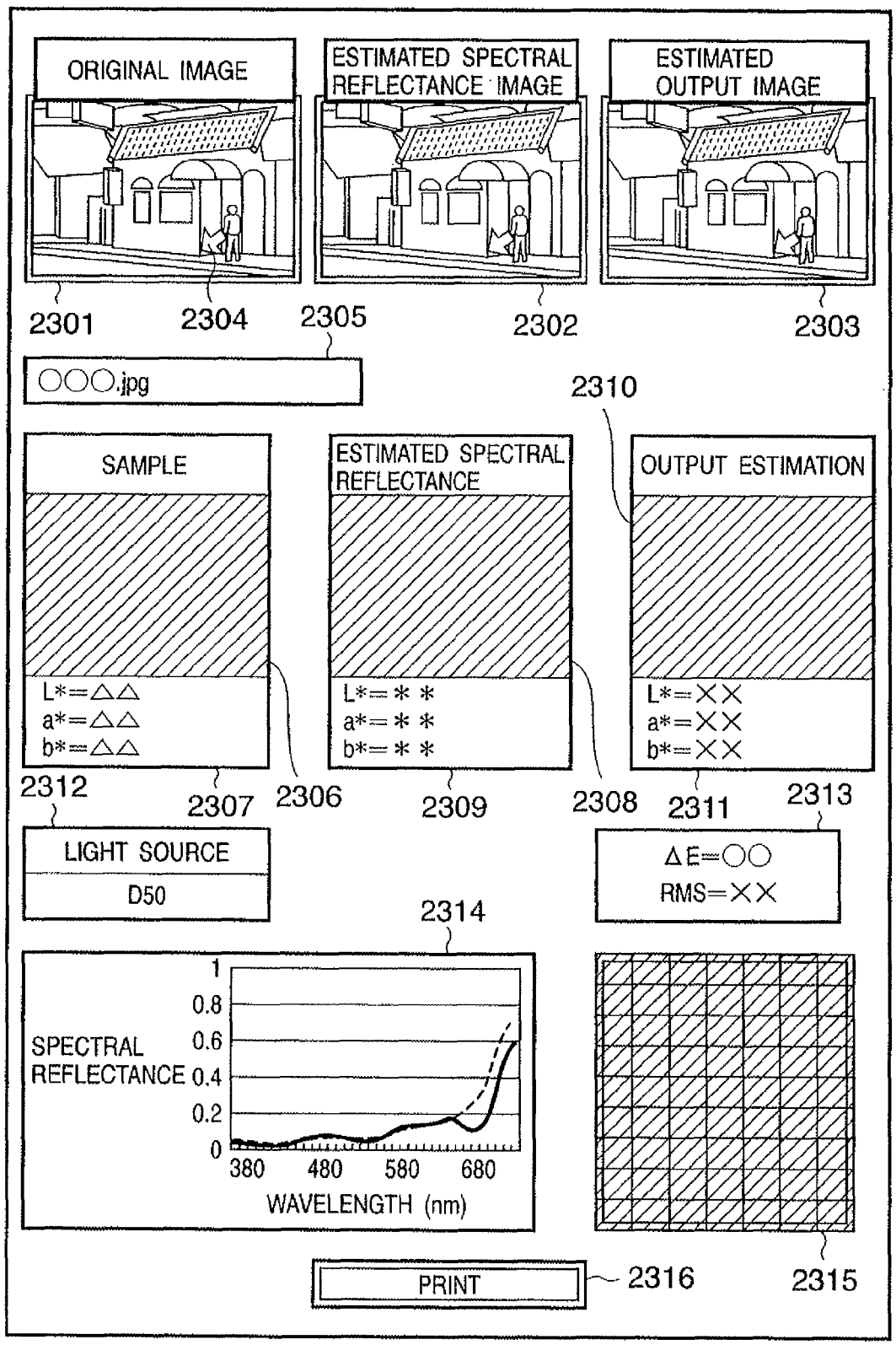
FIG. 17 shows an example of a user interface in the fourth embodiment.

The overall color reproduction process by the color reproduction apparatus with the above arrangement will be described below. FIG. 16 is a flow chart for explaining the color reproduction process executed by the color reproduction apparatus of the fourth embodiment. FIG. 17 shows an example of a user interface used in the color reproduction process. Note that the user interface shown in FIG. 17 is displayed on the display device 2010.

In step S2201, an image file which is designated by the user in an input image file name designation area 2305 is loaded from the image database 2002, the R, G, and B values of the image are converted into device (monitor) R, G, and B values using an ICC profile or the like, and the converted image is displayed on an original image display area 2301. In step S2202, the spectral reflectance estimation unit 2004 estimates the spectral reflectances corresponding to respective pixels in the original image displayed on the original image display area 2301 with reference to the spectral reflectance database 2003 (details will be described later). At this time, the estimated spectral reflectance data of respective pixels are converted into tristimulus values L*, a*, and b* (in this specification, L*, a*, and b* will be simply expressed as L, a, and b hereinafter) on the basis of light source information of user's choice at a light source selection area 2312, and are then converted into device R, G, and B data of the display device 2010. Then, an image based on the converted data is displayed on an estimated spectral reflectance image display area 2302.

In step S2203, the printer model 2005 makes output estimation to have the estimated spectral reflectance image as a target (details will be described later). That is, an output color (spectral reflectance) is estimated for each combination of dot quantities of color inks, and a combination approximate to the spectral reflectance is determined for each pixel of the estimated spectral reflectance image. The spectral reflectance data of respective pixels, which are obtained by the output estimation, are converted into tristimulus values L, a, and b on the basis of light source information of user's choice at the light source selection area 2312, and are then converted into device R, G, and B data of the display device 2010 with reference to an ICC profile or the like. Then, an image based on the converted data is displayed on an estimated output image display area 2303. If a satisfactory result is obtained in this state, the user presses a print button to start a print process (steps S2204, S2210, and S2211). On the other hand, if the color estimation result is unsatisfactory, the user designates such pixel to execute a modification process in step S2205 and subsequent steps.

It is checked in step S2204 if the user has designated a pixel in the original image displayed on the original image display area 2301 by a pixel designation pointer 2304 using a mouse or the like. If YES in step S2204, the flow advances to step S2205; otherwise, the flow jumps to step S2210. Note that the user may designate a pixel on the image displayed on the estimated spectral reflectance image display area 2302 or estimated output image display area 2303.

If the user has designated a pixel, in step S2205 the color of the pixel designated by the pixel designation pointer 2304 is displayed on a sample color display area 2306, and tristimulus values L, a, and b converted using an ICC profile or the like are displayed on an original image tristimulus value display area 2307.

In step S2205, the estimated spectral reflectance of the corresponding pixel in the estimated spectral reflectance image is displayed on a spectral reflectance display area 2314 (indicated by the broken curve in FIG. 17). Tristimulus values L, a, and b calculated using light source information selected at the light source selection area 2312 are displayed on an estimated spectral reflectance tristimulus value display area 2309. Furthermore, these L, a, and b values are converted into device R, G, and B data of the display device 2010 using an ICC profile or the like, and the converted data are displayed as a color on an estimated spectral reflectance color display area 2308.

Furthermore, in step S2205 the estimated output spectral reflectance of the corresponding pixel on the estimated output image is displayed on the spectral reflectance display area 2314 (indicated by the solid curve in FIG. 17). Tristimulus values L, a, and b calculated using light source information selected at the light source selection area 2312 are displayed on an estimated output spectral reflectance tristimulus value display area 2311. Furthermore, these L, a, and b values are converted into device R, G, and B data of the display device 2010 using an ICC profile or the like, and the converted data are displayed as a color on an estimated output color display area 2310. An error display area 2313 displays an error between the estimated spectral reflectance and estimated output spectral reflectance at that time.

In step S2206, a plurality of top spectral reflectance candidates which have small color differences (CIELab color differences) from the pixel on the original image, which has been selected by the user using the pixel designation pointer 2304, are loaded from the spectral reflectance database. The tristimulus values of these candidates are calculated, and are converted into device R, G, and B data of the display device 2010, and are displayed on a change candidate patch display area 2315. It is determined in step S2207 whether or not the user has selected a change patch from those displayed on the change candidate patch display area 2315 using a mouse or the like. If YES in step S2207, the flow advances to step S2208; otherwise, the flow jumps to step S2210.

If the user has selected a given patch from the change candidate patch display area 2315, the display contents on the estimated spectral reflectance image display area 2302, estimated spectral reflectance color display area 2308, estimated spectral reflectance tristimulus value display area 2309, and spectral reflectance display area 2314 are updated in correspondence with the spectral reflectance of the selected change patch. In step S2209, output estimation is made by the same output estimation method as in step S2203 to have the spectral reflectance of the selected change patch as a target. Then, the display contents on the estimated output image display area 2303, estimated output color display area 2310, estimated output tristimulus value display area 2311, and spectral reflectance display area 2314 are updated in correspondence with the obtained estimated output value, and an error between the estimated spectral reflectance and estimated output spectral reflectance is displayed on the error display area 2313. At this time, the spectral reflectances of all pixels which have the same L, a, and b values as the designated L, a, and b values in the image are updated.

It is checked in step S2210 if the user has pressed a print button 2316. If YES in step S2210, the flow advances to step S2211; otherwise, the flow returns to step S2204. In step S2211, the image output unit 2007 generates print data using the dot quantities stored in the estimated output value storage unit 2006, and controls the image output device 2008 to output an image.

As described above, according to the fourth embodiment, a color conversion process that converts an input image signal into an output image signal estimates the spectral distribution characteristics of an original scene of an image, and sets an output image signal (ink dot quantities) to reproduce the estimated spectral distribution characteristics as faithfully as possible. For this reason, the color conversion process that can make accurate color reproduction of an original scene of an image can be implemented even in different observation environments.

<Spectral Reflectance Estimation Method Corresponding to Each Pixel of Original Image>

Details of the spectral reflectance estimation method corresponding to each pixel of an original image in step S2202 will be explained below.

In general, calculating the spectral reflectance of an object from the R, G, and B values of an image or tristimulus values L, a, and b calculated using an ICC profile or the like is an inverse problem that calculates about 30 output values from three inputs. Hence, this problem cannot be uniquely solved. However, using the spectral reflectance database, the tristimulus values L, a, and b of the spectral reflectance in the database are calculated, and a spectral reflectance which is closest to the tristimulus values of a pixel in an image, i.e., has a smallest color difference, is selected, thus reproducing the spectral reflectance characteristics of an object in the image. The color difference (ΔE) is calculated using L, a, and b values converted from the R, G, and B values of an image, and those calculated from the spectral reflectance saved in the spectral reflectance database by:

$$\Delta E = \sqrt{(L_1-L_2)^2 + (a_1-a_2)^2 + (b_1-b_2)^2} \quad (12)$$

where $(L_1, a_1, b_1)$ is the Lab value of a pixel, and $(L_2, a_2, b_2)$ is the Lab value of the spectral reflectance stored in the spectral reflectance database.

Figure 22:
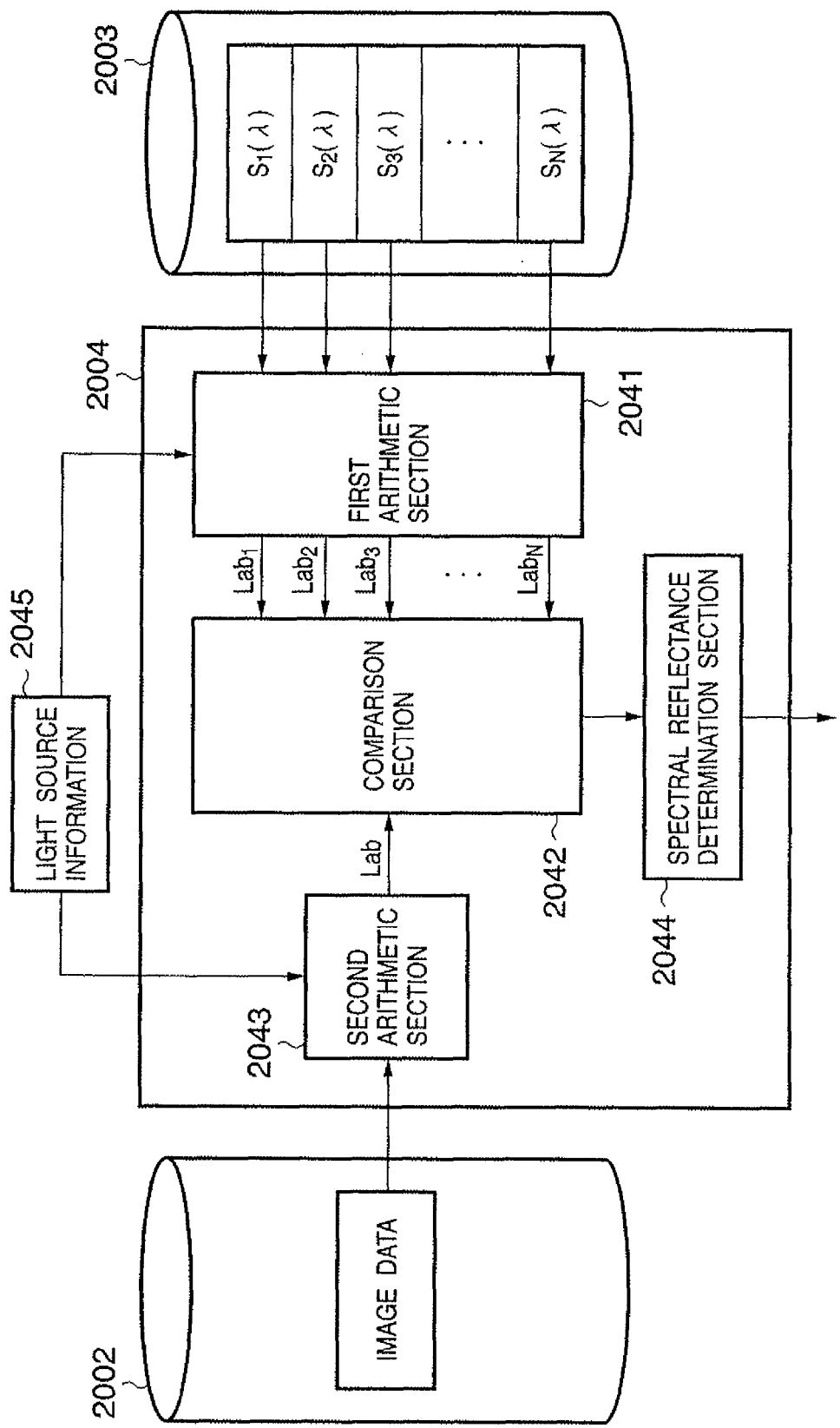
FIG. 22 is a block diagram for explaining details of a spectral reflectance estimation unit 2004 according to the fourth embodiment.
Figure 23:
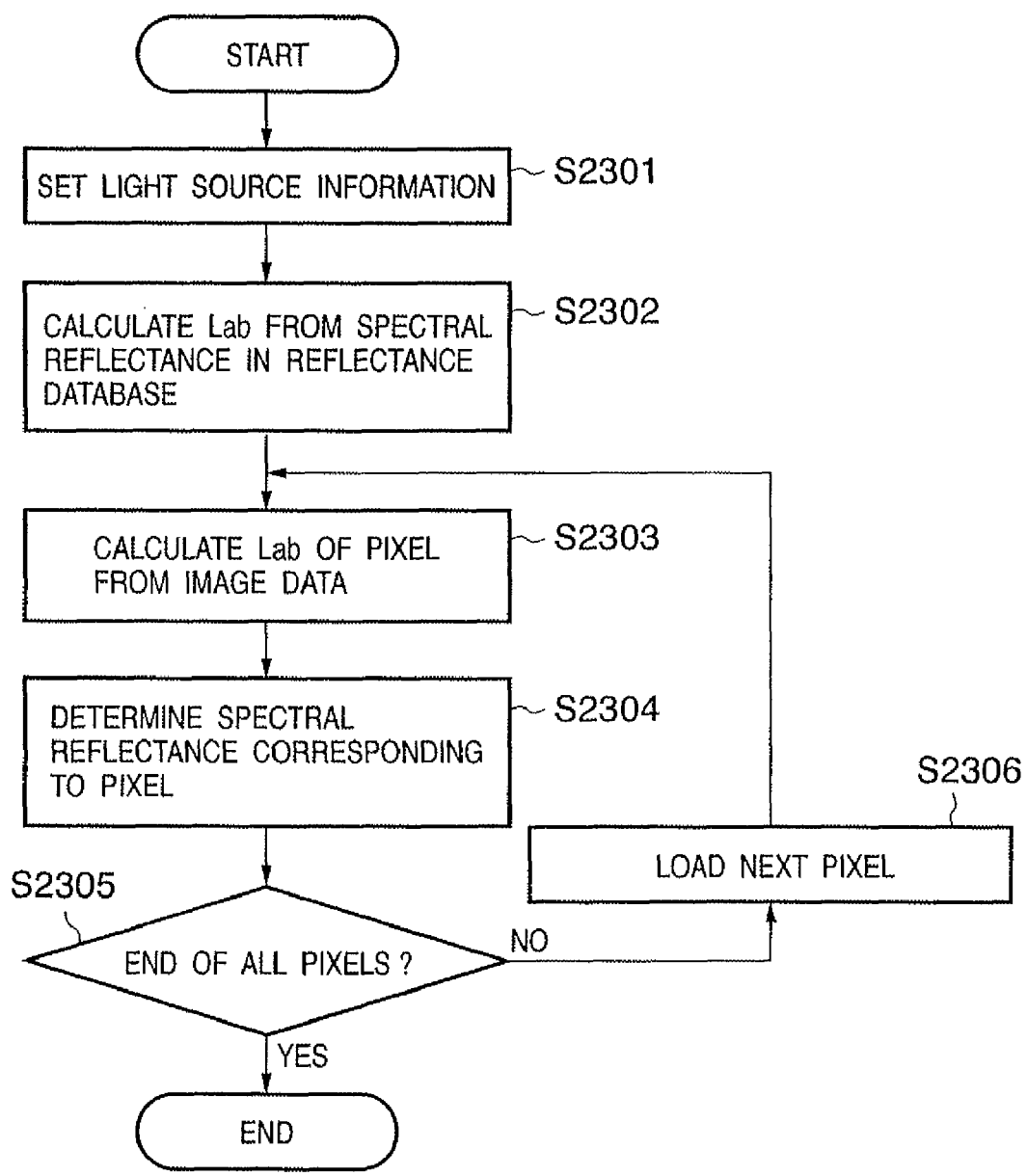
FIG. 23 is a flow chart for explaining a spectral reflectance estimation process by the spectral reflectance estimation unit 2004.

FIG. 22 is a block diagram for explaining details of the spectral reflectance estimation unit 2004 according to the fourth embodiment. FIG. 23 is a flow chart for explaining a spectral reflectance estimation process by the spectral reflectance estimation unit 2004. As shown in FIG. 22, spectral reflectance estimation unit 2004 includes a first arithmetic section 2041, comparison sector 2042, second arithmetic section 2043, and spectral reflectance determination section 2044.

In step S2301, light source information 2045 of a light source set at the light source selection area 2312 is acquired. In step S2302, the first arithmetic section 2041 calculates tristimulus values ($Lab_1$ to $Lab_N$) for all spectral reflectance data stored in the spectral reflectance database 2003 using the light source information calculated in step S2301.

In step S2303, the second arithmetic section 2043 accesses the image database 2003 to acquire pixel data (R, G, and B values) of image data designated by the input image file name designation area 2305, and converts the acquired R, G, and B values into tristimulus values (L, a, and b) using the light source information 2045. In step S2304, the comparison section 2042 selects L, a, and b values closest to (having a smallest color difference from) those calculated by the second arithmetic section 2043 from $Lab_1$ to $Lab_N$ calculated by the first arithmetic section 2041. The spectral reflectance determination section 2044 reads out spectral reflectance data corresponding to the L, a, and b value determined by the comparison section 2042 from the spectral reflectance database 2003, and determines it as the spectral reflectance of the pixel of interest.

The aforementioned processes are repeated for all pixels of the designated image data, and this process ends (steps S2305 and S2306).

Note that the spectral reflectance to be estimated need not always correspond to one spectral reflectance database information per pixel. For example, top n spectral reflectance data having smaller color differences from a target color, and a weighted mean of these spectral reflectance data may be calculated by:

$$S_{out}(\lambda) = \sum_{i=1}^{n} \frac{w_i \cdot S_i(\lambda)}{n} \quad (13)$$

where $w_i$ is a weighting coefficient.

<Printer Output Estimation>

Figure 18:
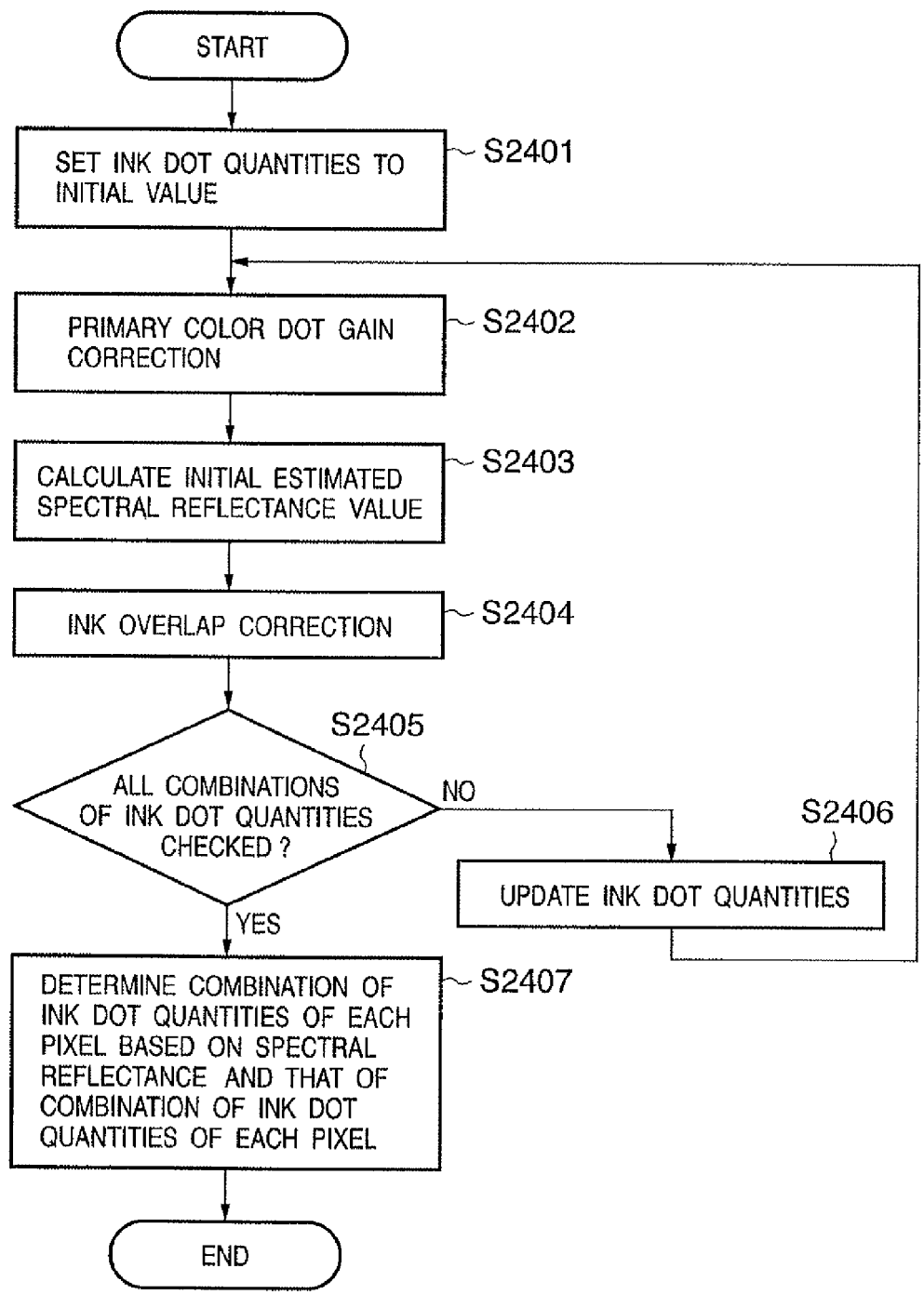
FIG. 18 is a flowchart for explaining an output estimation process.

Details of the output estimation process in steps S2203 and S2209 in FIG. 16 will be described below using FIG. 18. FIG. 18 is a flow chart for explaining the output estimation process executed in step S2203 and S2209.

In FIG. 18, steps S2401 to S2404 are the same as steps S301 to S304 in the first embodiment (FIG. 3). That is, in step S2401 all the dot quantities of inks to be adopted are set to be an initial values (e.g., 0%). In step S2402, dot gain correction of primary colors is made (details have been explained using FIG. 4, and FIGS. 5A and 5B). In step S2403, using the spectral reflectances of inks that have undergone the primary color dot gain correction, an initial estimated spectral reflectance value is calculated using equations (5) to (7) above. In step S2404, the initial estimated spectral reflectance value calculated in step S2403 undergoes ink overlap correction (details have been described using FIG. 6 and equation (8)).

It is checked in step S2405 if all combinations (e.g., in 1%-increments from 0% to 100%) of the dot quantities of the inks used have undergone output estimation. If YES in step S4405, the process ends; otherwise, the flow advances to step S2406. In step S2406, the ink dot quantities are changed by a given amount, and the flow returns to step S2402 to repeat the aforementioned process.

If the estimated values of the spectral reflectances are obtained for all the combinations of ink dot quantities, the flow advances from step S2405 to step S2407. In step S2407, a spectral reflectance, which is closest to that estimated in step S2202 (has the smallest error) is specified for each pixel, and ink dot quantities corresponding to this spectral reflectance are determined as those for the pixel of interest. Note that the error calculation method in step S2407 is as has already explained above using equations (9) and (10).

Fifth Embodiment

In the fourth embodiment, upon modifying a reproduction color, reproduction color candidates associated with the selected pixel are displayed on the change candidate patch display area 2315, and a reproduction color (spectral reflectance) selected from these candidates is adopted. In the fifth embodiment, spectral reflectance data in the spectral reflectance database are classified into categories such as "flesh color", "flower color", and the like, and upon modifying a reproduction color, a list of registered categories is presented in place of the change candidate patch display area 2315 to prompt the user to select a desired category. The fifth embodiment will be described in detail below.

Figure 19:
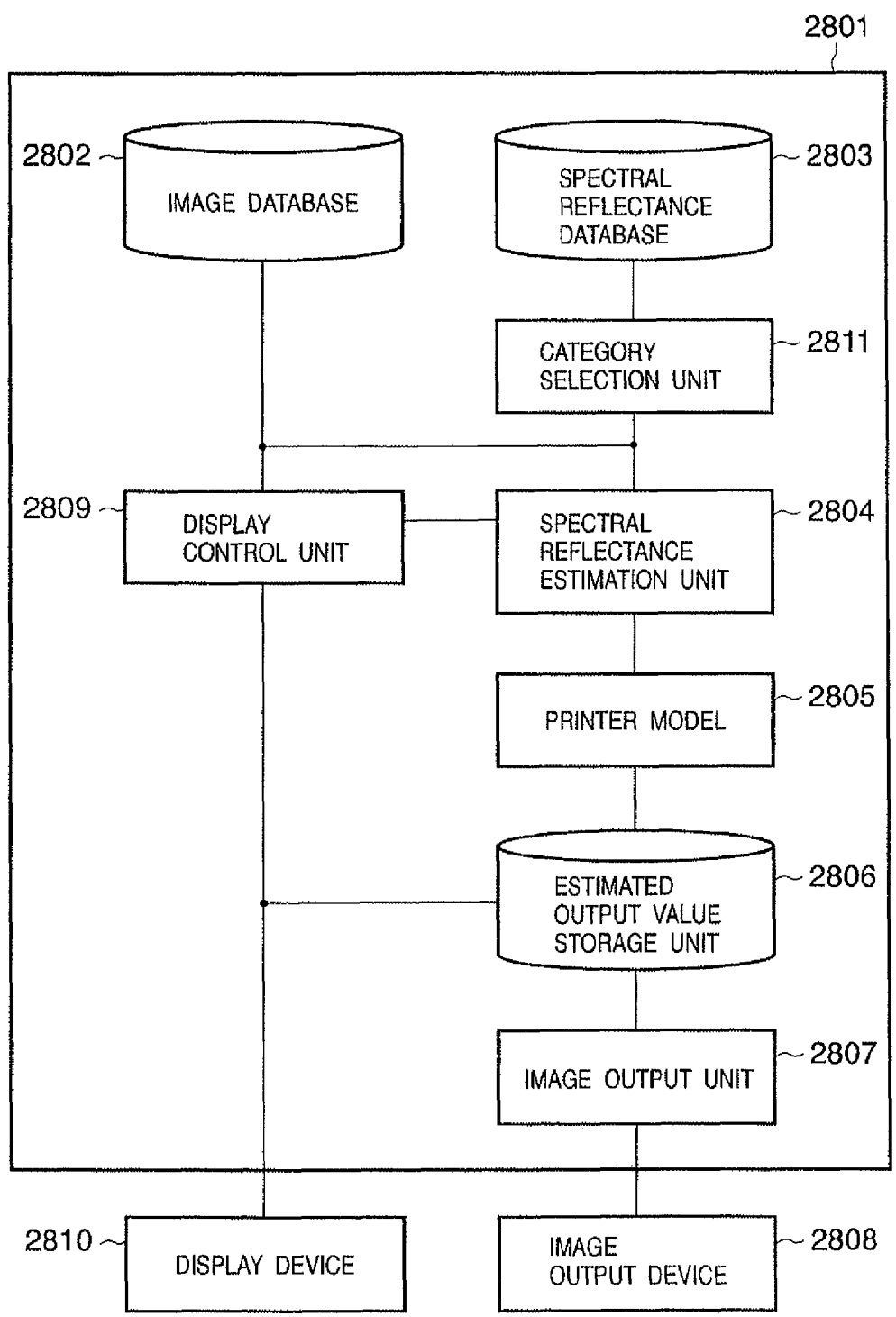
FIG. 19 is a block diagram showing the arrangement of a color reproduction apparatus according to the fifth embodiment.

FIG. 19 is a block diagram showing the arrangement of a color reproduction apparatus according to the fifth embodiment. Reference numeral 2801 denotes a color reproduction apparatus according to the fifth embodiment. Reference numeral 2802 denotes an image database which stores image data to be output by an image output device 2808. Note that image data stored in the image database 2802 is data that expresses an image on an RGB space. Reference numeral 2803 denotes a spectral reflectance database which stores spectral reflectance data of respective colors. Note that the spectral reflectance database 2803 of the fifth embodiment registers spectral reflectance data which are classified into a plurality of different categories like those which are used when an object is flesh, those which are used when an object is plant, and so forth. Reference numeral 2804 denotes a spectral reflectance estimation unit, which estimates a spectral reflectance from the R, G, and B values of an image selected from the image database 2802 using the spectral reflectance database 2803.

Reference numeral 2805 denotes a printer model which estimates the spectral reflectance of a recording result of the image output device 2808. Reference numeral 2806 denotes an estimated output value storage unit which stores the estimated output value estimated by the printer model 2805. Reference numeral 2807 denotes an image output unit, which outputs image data that makes the image output device 2808 output an image. Reference numeral 2808 denotes an image output device such as a printer or the like, which outputs an image. Reference numeral 2809 denotes a display control unit which controls display on a display device 2810. Reference numeral 2810 denotes a display device which comprises a CRT or LCD, and displays various processing results under the display control of the display control unit 2809. Reference numeral 2811 denotes a category selection unit for selecting spectral reflectance data that belongs to a desired category from those stored in the spectral reflectance database.
<Overall Process>

The color reproduction process according to the fifth embodiment will be described below.

Figure 20:
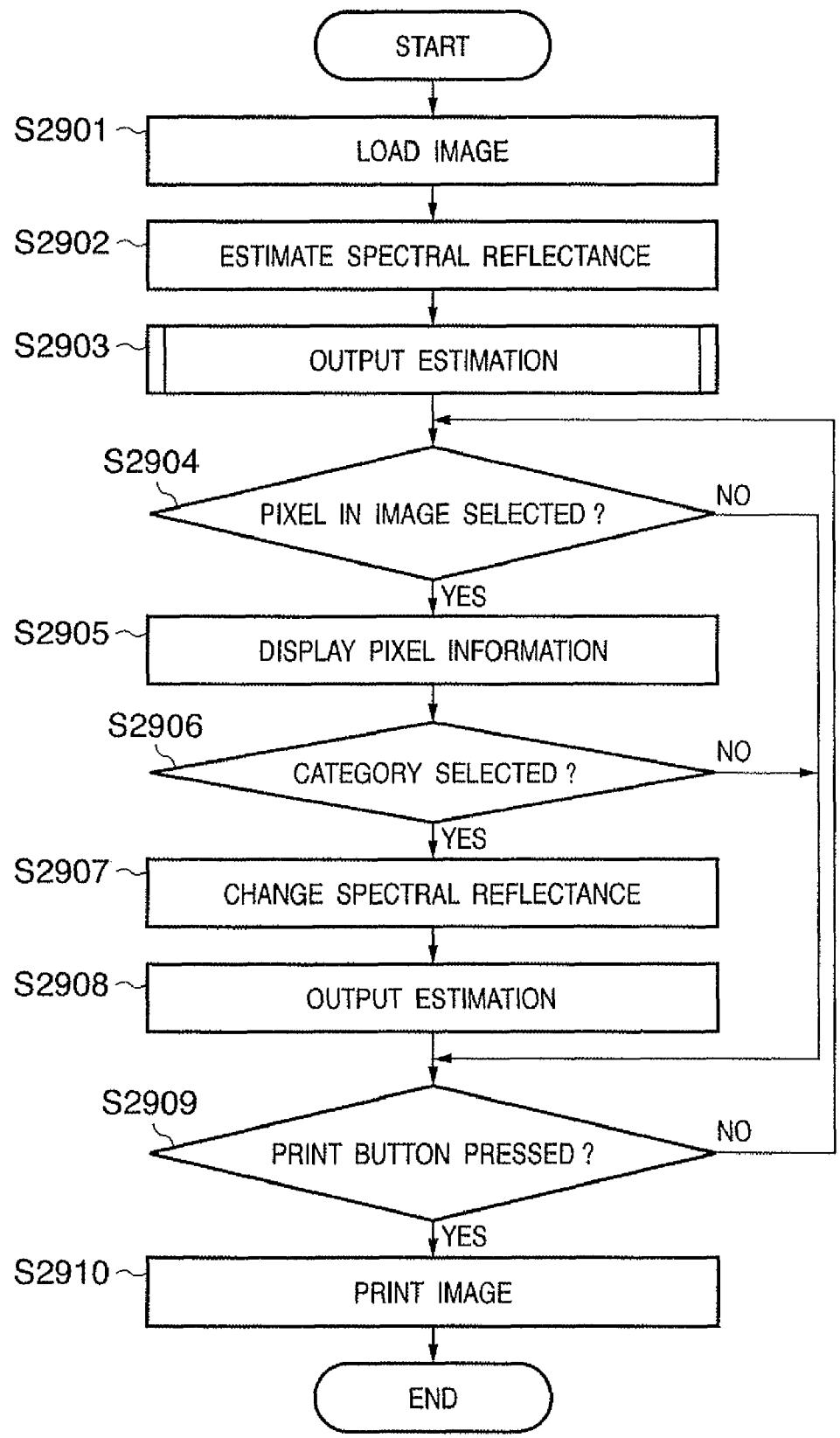
FIG. 20 is a flow chart for explaining a color reproduction process according to the fifth embodiment.
Figure 21:
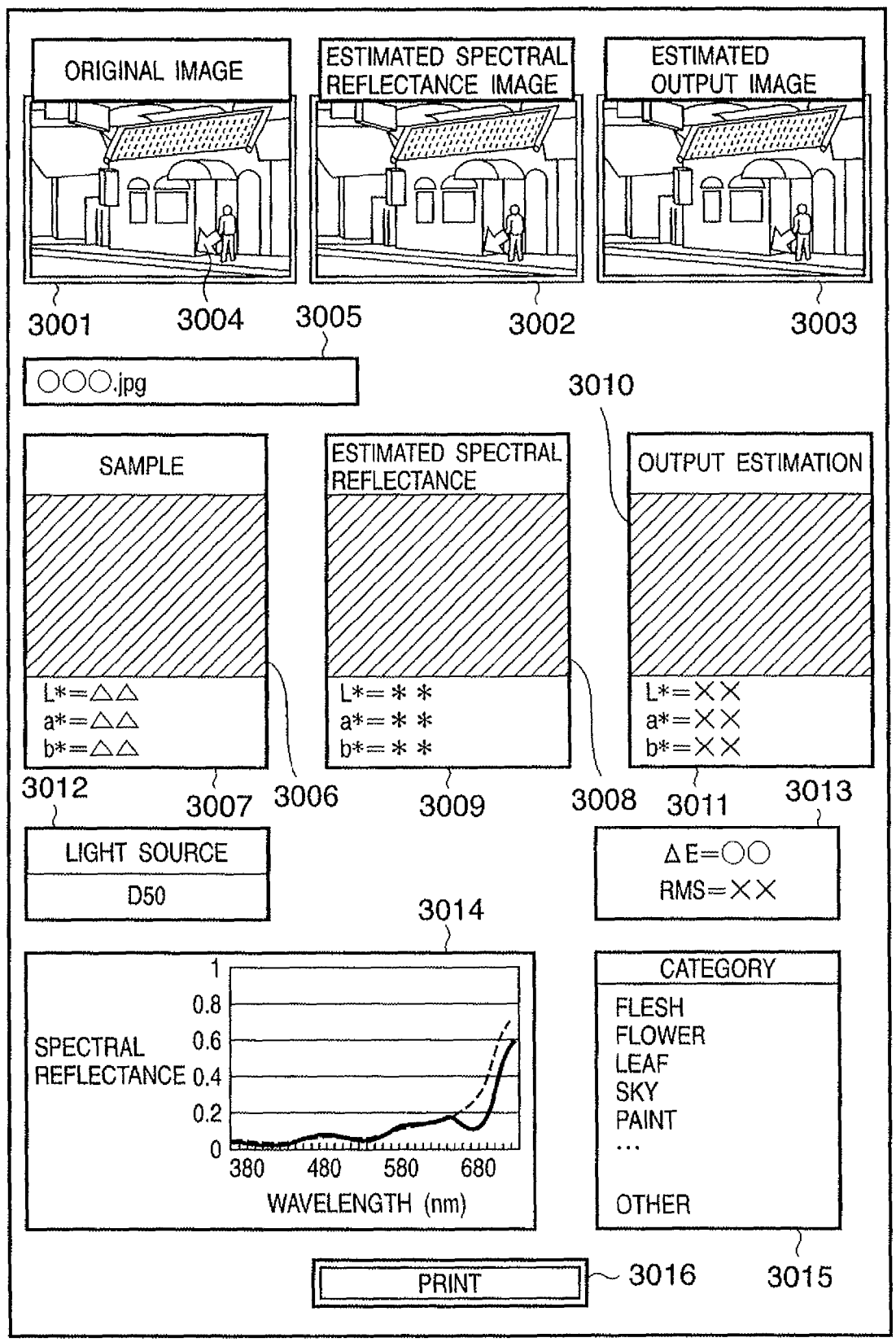
FIG. 21 shows an example of a user interface in the fifth embodiment.

FIG. 20 is a flow chart for explaining the color reproduction process according to the fifth embodiment. FIG. 21 shows an example of a user interface used in color reproduction.

In step S2901, an image file which is designated by the user in an input image file name designation area 3005 is loaded from the image database 2802, and is displayed on an original image display area 3001. In step S2902, the spectral reflectance estimation unit 2804 estimates the spectral reflectances corresponding to respective pixels in the original image displayed on the original image display area 3001 (details will be described later). At this time, the estimated spectral reflectance data of respective pixels are converted into tristimulus values L, a, and b on the basis of light source information of user's choice at a light source selection area 3012, and are then converted into device R, G, and B data of the display device 2810. Then, an image based on the converted data is displayed on an estimated spectral reflectance image display area 3002 as an estimated spectral reflectance image.

In step S2903, the printer model 2805 makes output estimation to have the estimated spectral reflectance image as a target in the same manner as in the fourth embodiment (S2203 in FIG. 16). At this time, spectral reflectance data of respective pixels, which are obtained by the output estimation, are converted into tristimulus values L, a, and b on the basis of light source information of user's choice at the light source selection area 3012, and are then converted into device R, G, and B data of the display device 2810 with reference to an ICC profile or the like. Then, an image based on the converted data is displayed on an estimated output image display area 3003 as an estimated output image.

It is checked in step S2904 if the user has designated a pixel in the original image displayed on the original image display area 3001 by a pixel designation pointer 3004 using a mouse or the like. If YES in step S2904, the flow advances to step S2905; otherwise, the flow jumps to step S2909. In step S2905, the color of the pixel designated by the pixel designation pointer 3004 is displayed on a sample color display area 3006, and tristimulus values L, a, and b converted using an ICC profile or the like are displayed on an original image tristimulus value display area 3007.

Also, the estimated spectral reflectance of the corresponding pixel in the estimated spectral reflectance image displayed on the area 3002 is displayed on a spectral reflectance display area 3014 (indicated by the broken curve in FIG. 21). In addition, tristimulus values L, a, and b calculated using light source information of a light source selected at the light source selection area 3012 are displayed on an estimated spectral reflectance tristimulus value display area 3009. Furthermore, these L, a, and b values are converted into device R, G, and B data of the display device 2810 using an ICC profile or the like, and the converted data are displayed on an estimated spectral reflectance color display area 3008.

Moreover, the estimated output spectral reflectance of the corresponding pixel on the estimated output image is displayed on the spectral reflectance display area 3014 (indicated by the solid curve in FIG. 21). Tristimulus values L, a, and b calculated using this spectral reflectance and light source information selected at the light source selection area 3012 are displayed on an estimated output tristimulus value display area 3011. Also, these L, a, and b values are converted into device R, G, and B data of the display device 2810 using an ICC profile or the like, and the converted data are displayed on an estimated output color display area 3010.

An error display area 3013 displays an error between the estimated spectral reflectance and estimated output spectral reflectance.

It is checked in step S2906 if the user has selected a category from a category menu 3015 provided by the category selection unit 2811 using a mouse or the like. If YES in step S2906, the flow advances to step S2907; otherwise, the flow jumps to step S2909. Note that the category menu 3015 is displayed as a list of categories, which are extracted from those registered in the spectral reflectance database 2803 by the category selection unit 2811.

In step S2907, the category selection unit 2811 selects spectral reflectance data, which belong to the selected category, from those stored in the spectral reflectance database 2802 as estimated spectral reflectance candidates, and determines one of the estimated spectral reflectance candidates, which has the smallest color difference from the pixel designated by the user by the pixel designation pointer 3004. The display contents on the estimated spectral reflectance image display area 3002, estimated spectral reflectance color display area 3008, estimated spectral reflectance tristimulus value display area 3009, and spectral reflectance display area 3014 are updated in correspondence with the estimated spectral reflectance which is acquired in this way. At this time, for example, if the user wants to convert all flesh color pixels in an image into a flesh color category, much labor is often required to designate all flesh color pixels and to convert their categories. Hence, pixels whose color differences (ΔE) from the designated pixel fall within the ΔE allowable value range of all the pixels in the image may be converted to the same category as that of the designated pixel.

In step S2908, output estimation is made by the same output estimation method as in step S2903 to have the spectral reflectance data of the selected category as a target. Then, the display contents on the estimated output image display area 3003, estimated output color display area 3010, estimated output tristimulus value display area 3011, and spectral reflectance display area 3014 in step S2905 are updated in correspondence with the obtained new estimated output value. Also, an error between the estimated spectral reflectance and estimated output spectral reflectance is displayed on the error display area 3013.

It is checked in step S2909 if the user has pressed a print button 3016. If YES in step S2909, the flow advances to step S2910; otherwise, the flow returns to step S2904. In step S2910, the image output unit 2807 controls the image output device 2808 to output an image using the dot quantities stored in the estimated output value storage unit.

<Spectral Reflectance Estimation Method Corresponding to Each Pixel of Original Image>

Details of the spectral reflectance estimation method corresponding to each pixel of an original image in step S2902 will be explained below.

The method of calculating the tristimulus values of an object from the R, G, and B values of an image or tristimulus values L, a, and b calculated using an ICC profile or the like is the same as that in the fourth embodiment. In the fifth embodiment, since the spectral distributions of flesh color, glass color, and the like, which are called memory colors, among those present the natural world have similar spectral reflectance characteristics for respective categories, the spectral reflectance with higher reality can be estimated by selecting a category.

<Spectral Reflectance Database>

In the fifth embodiment, spectral reflectance data stored in the spectral reflectance database 2803 may be those which are measured and are classified in categories by the user himself or herself, or a general database whose contents are classified into categories such as flesh, glass, flower, and the like (e.g., a color reproduction evaluation standard object color spectral database (SOCS, published by Japanese Standards Association)) may be used. That is, the database need only store the calorimetric values of spectral reflectances of objects and their categories. Of course, data measured by the user or the like may be added.

<Pixel Designation Method>

In the fourth and fifth embodiments, the user designates a pixel in an original image using the pixel designation pointer. Alternatively, the user may designate a region on an original image, which is segmented in advance into a general region segmentation method, in place of a pixel.

<User Interface>

In the fourth and fifth embodiments, FIGS. 17 and 21 show examples of the user interface. However, the present invention is not limited to such specific user interface. For example, the user selects a desired light source on the light source information selection area 2512 or 3012. Alternatively, a file that describes light source data in advance may be loaded. That is, the configuration of the user interface is not particularly limited as long as the user can make required setups.

As described above, according to the fourth and fifth embodiments, a color conversion process that converts an input image signal into an Output image signal can estimate and reproduce the spectral distribution characteristics of an input image, thus realizing accurate color reproduction.

Sixth Embodiment

Figure 24:
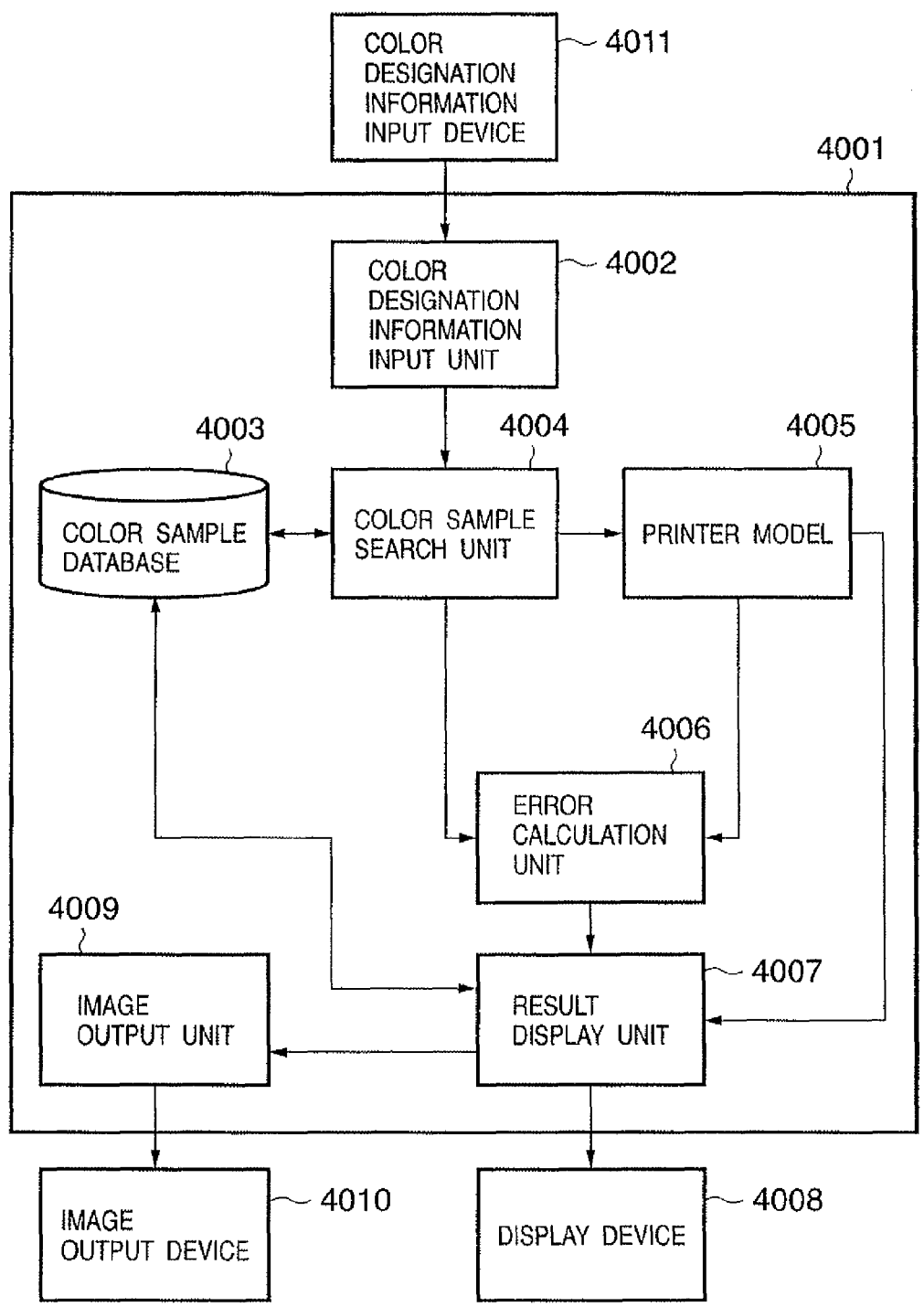
FIG. 24 is a block diagram showing the arrangement of a color reproduction apparatus according to the sixth embodiment.

FIG. 24 is a block diagram showing the arrangement of a color reproduction apparatus according to the sixth embodiment.

Referring to FIG. 24, reference numeral 4001 denotes a color reproduction apparatus according to an embodiment of the present invention. Note that the color reproduction apparatus 4001 can be realized by executing a control program that implements processes to be described later using a versatile computer. Reference numeral 4002 denotes a color designation information input unit which makes the user input color designation information. Reference numeral 4003 denotes a color sample database, which stores the color names of color samples and spectral reflectance data in correspondence with each other. Reference numeral 4004 denotes a color sample search unit, which searches the color sample database 4003 for spectral reflectance data of a color sample on the basis of the color designation information input by the color designation information input unit 4002. Reference numeral 4005 denotes a printer model, which estimates an output color (spectral reflectance of printer output) on the basis of the spectral reflectance data and dot quantities of respective inks.

Reference numeral 4006 denotes an error calculation unit, which calculates an error between the spectral reflectance data of the color sample retrieved by the color sample search unit 4004, and the spectral reflectance estimated by the printer model 4005. Reference numeral 4007 denotes a result display unit, which displays the output estimation result of the printer model 4005 on a display device 4008. Reference numeral 4008 denotes a display device, which comprises a CRT, LCD, or the like, and displays a result. The color sample database 4003 and result display unit 4007 communicate with each other to display the selected color sample by the result display unit 4007. Reference numeral 4009 denotes an image output unit, which controls an image output device 4010 to output a visible image. Reference numeral 4010 denotes an image output device, which comprises a printer or the like, and outputs an image. Reference numeral 4011 denotes a color designation information input device, which comprises a keyboard, mouse, and the like.

<Overall Process>

Figure 25A:
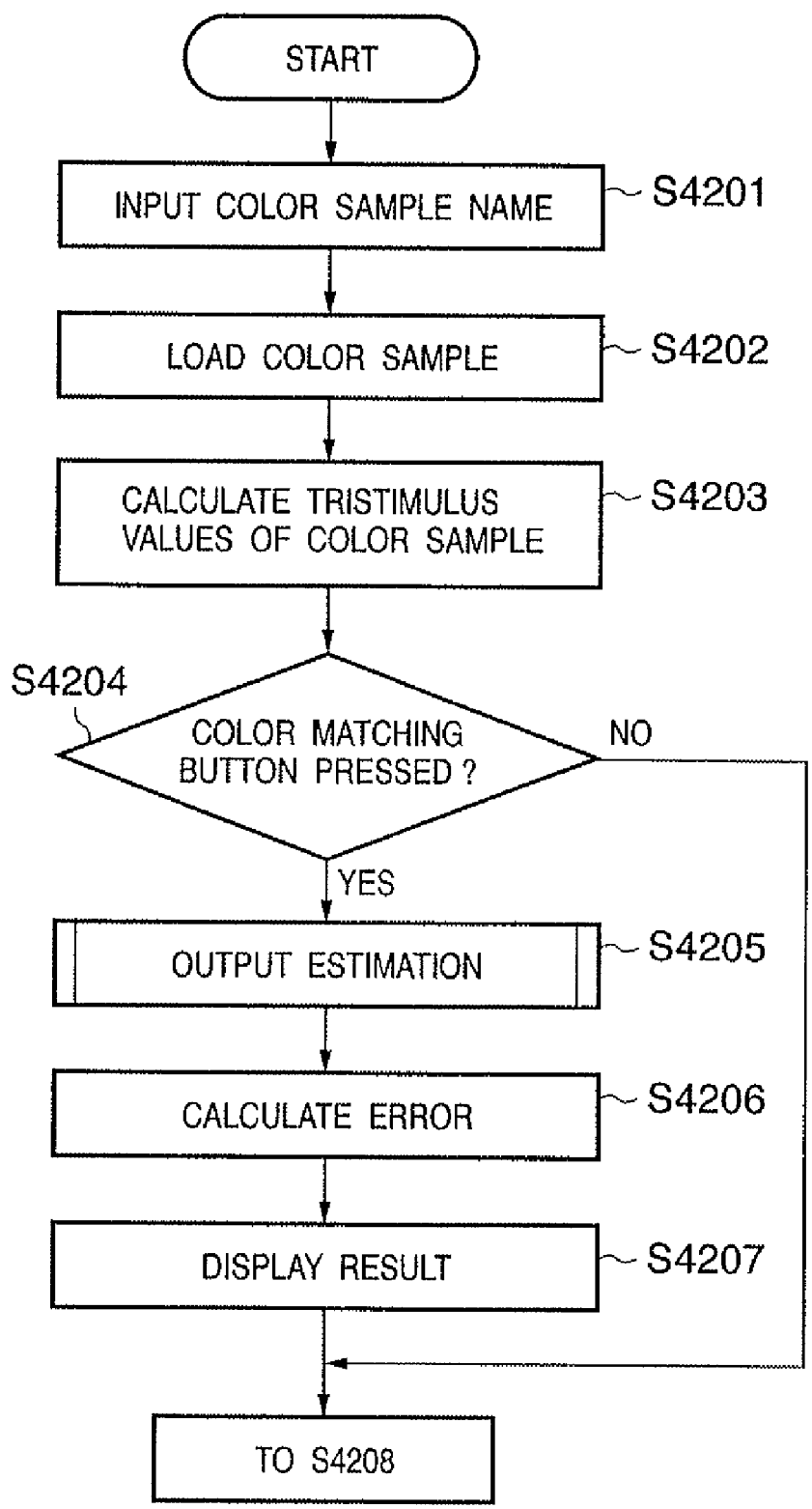
FIG. 25A is a flow chart showing a color reproduction process executed by the color reproduction apparatus of the sixth embodiment.
Figure 25B:
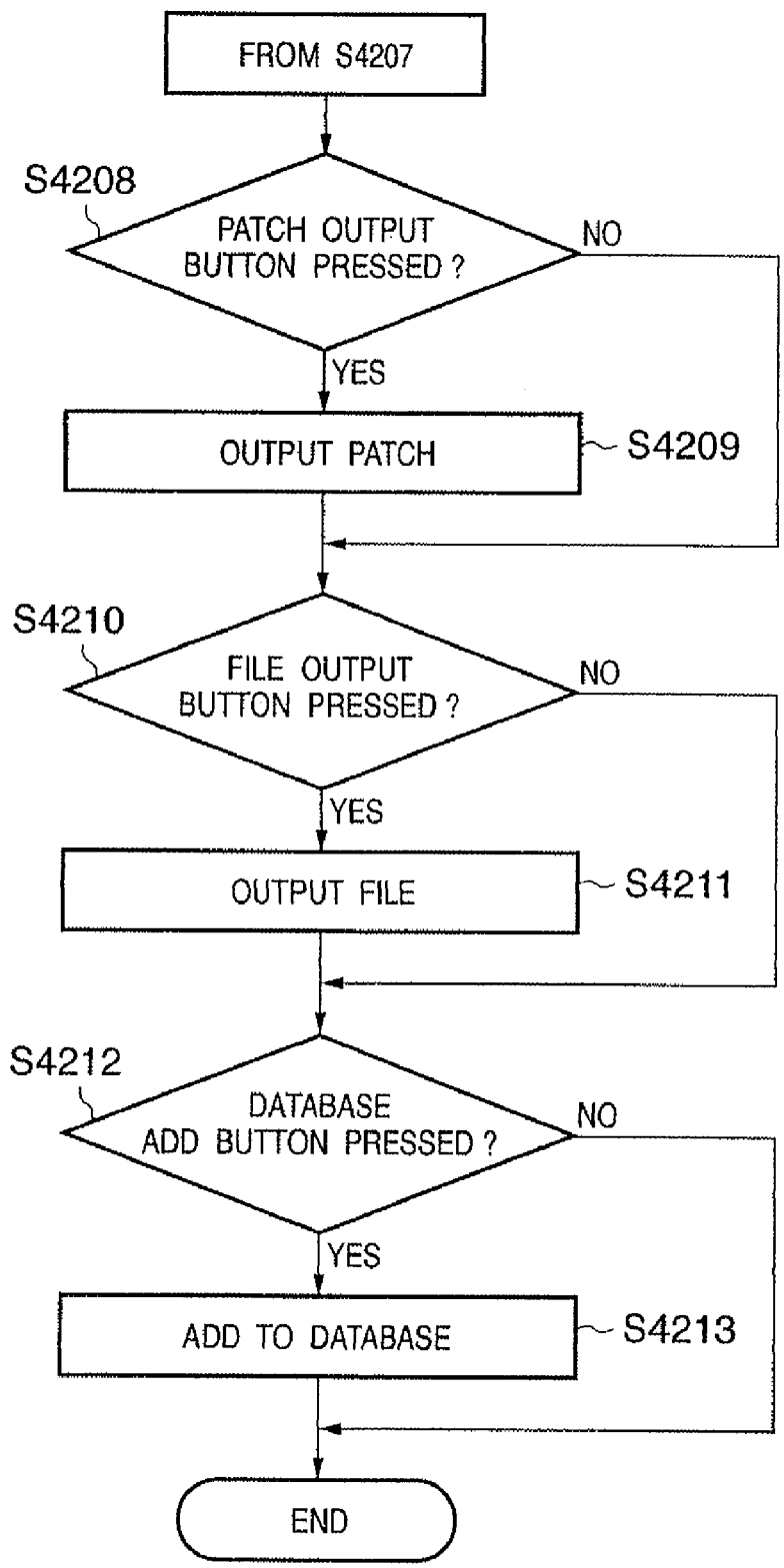
FIG. 25B is a flow chart showing a color reproduction process executed by the color reproduction apparatus of the sixth embodiment.
Figure 26:
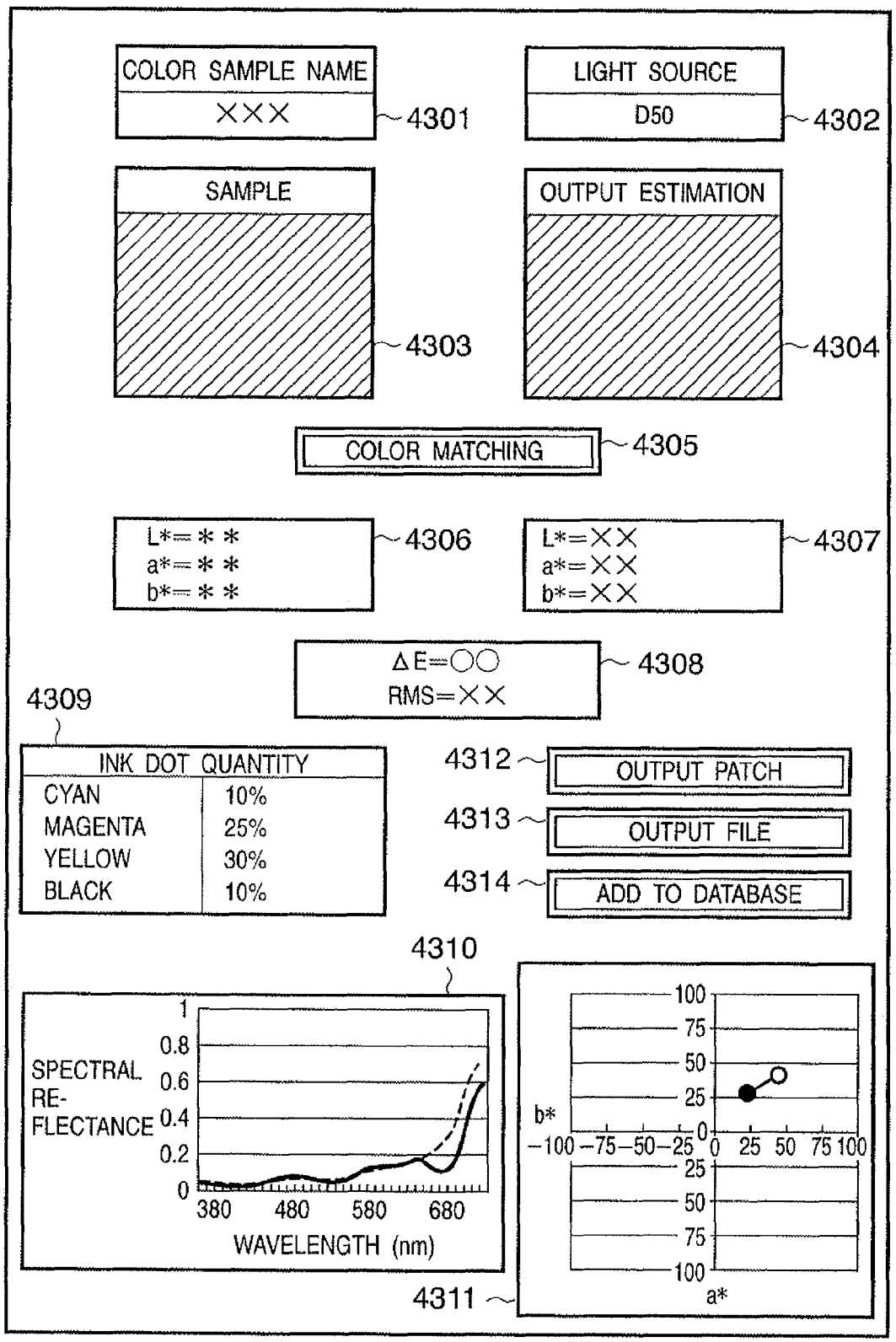
FIG. 26 shows an example of a user interface used in the color reproduction process of the sixth embodiment.

A color reproduction process according to the sixth embodiment will be described below. FIGS. 25A and 25B are flow charts showing the color reproduction process executed by the color reproduction apparatus 4001. FIG. 26 shows an example of a user interface used in the color reproduction process. The user interface shown in FIG. 26 is displayed on the display device 4008, and an operation input to the user interface is made via a keyboard or mouse which forms the color designation information input device 4011.

In step S4201, the user selects a desired color sample name from print color sample Nos. (to be referred to as color sample names hereinafter) such as DIC, Pantone, or the like, which are stored in the color sample database 4003, in a color sample name selection area 4301 using the color designation information input device 4011. In processes to be described below, in step S4202 the color sample search unit 4004 loads spectral reflection data of the color sample designated in step S4201 from the color sample database 4003. In step S4203, the color sample search unit 4004 calculates tristimulus-values (L*, a*, and b*) of the loaded spectral reflectance data, and displays the calculated values on a color sample tristimulus value display area 4306. Also, the calculated tristimulus values are converted into the device R, G, and B values of the display device 4008 using an ICC profile or the like, and the device R, G, and B values are displayed on a color sample confirmation area 4303. At this time, the user can designate light source information required to calculate the tristimulus value at a light source information selection area 4302. Note that the color sample name selection area 4301 and light source information selection area 4302 may display lists of color samples and light source information registered in the apparatus, and may make the user select desired ones from these lists.

It is checked in step S4204 if the user has pressed a color matching button 4305 (if he or she has clicked that button using a mouse). If YES in step S4204, a color matching process in steps S4205 to S4207 is executed; otherwise, the flow skips to step S4208. In the color matching process, the printer model 4005 estimates the spectral reflectance of a reproduction color to be output by the image output device 4010 in step S4205 (the spectral reflectance estimation process, i.e., printer output estimation, will be described later). At this time, the tristimulus values (L*, a*, and b*) of the estimated spectral reflectance are calculated, and are displayed on an output tristimulus value display area 4307. Also, the calculated tristimulus values are converted into the device R, G, and B values of the display device 4008 using an ICC profile or the like, and the device R, G, and B values are displayed on an output estimation confirmation area 4304.

In step S4206, the error calculation unit 4006 calculates an error between each color (spectral reflectance) estimated by the printer model 4005, and the color (spectral reflectance) of the color sample (the error calculation method is as has been explained in the first embodiment using equations (9) and (10)), and acquires a combination of ink dot quantities that can obtain the estimated color corresponding to the smallest error from the color sample. In step S4207, the result display unit 4007 displays the obtained result on the display device 4008. That is, the smallest one of errors calculated by the error calculation unit 4006 is displayed on an error display area 4308, the ink dot quantities at that time are displayed on an ink dot quantity display area 4309, and the spectral reflectances and L, a, and b values of the color sample and estimated output value are respectively displayed on a spectral reflectance display area 4310 and tristimulus value display area 4311. Note that the spectral reflectance display area displays the spectral reflectance of the color sample using the solid curve, and the estimated spectral reflectance using the broken curve. Also, the tristimulus value display area 4311 displays the value of the color sample using a full dot, and the estimated value using an open dot. Note that the open dot and full dot displayed on the tristimulus value display area 4311 plot only a and b values of points having different L, a, and b values. That is, the area 4311 presents a graph which projects two points onto an a-b plane. This is to confirm a chromaticity difference between two points, and lightness values (L values) are confirmed on the color sample tristimulus value display area 4306 and output tristimulus value display area 4307.

It is checked in step S4208 if the user has pressed a patch output button 4312. If YES in step S4208, the flow advances to step S4209 to execute a patch output process; otherwise, the flow jumps to step S4210. Note that the patch output button 4312 is enabled only after the color matching process has been done, since the patch output process uses the result of the color matching process in steps S4205 to S4207. In step S4209, the image output unit 4009 outputs a patch via the image output device 4010 using the dot quantities displayed on the ink dot quantity display area 4309.

It is checked in step S4210 if the user has pressed a file output button 4313. If YES in step S4210, the flow advances to step S4211 to execute a file output process; otherwise, the flow jumps to step S4212. Note that the file output button 4313 is enabled only after the color matching process has been done, since the file output process uses the result of the color matching process in steps S4205 to S4207. In step S4211, the dot quantities displayed on the ink dot quantity display area 4309 are output to a text file.

It is checked in step S4212 if the user has pressed a database add button 4314. If YES in step S4212, the flow advances to step S4213 to execute a database add process; otherwise, this process ends. Note that the database add button 4314 is enabled only after the color matching process has been done, since the database add process uses the result of the color matching process in steps S4205 to S4207. In step S4213, the color sample name retrieved by the color sample search unit 4004 and the dot quantities displayed on the ink dot quantity display area 4309 (those which are estimated to reproduce a color having a spectral reflectance closest to that color sample name) are additionally stored in the color sample database in correspondence with each other.

<Printer Output Estimation>

Figure 27:
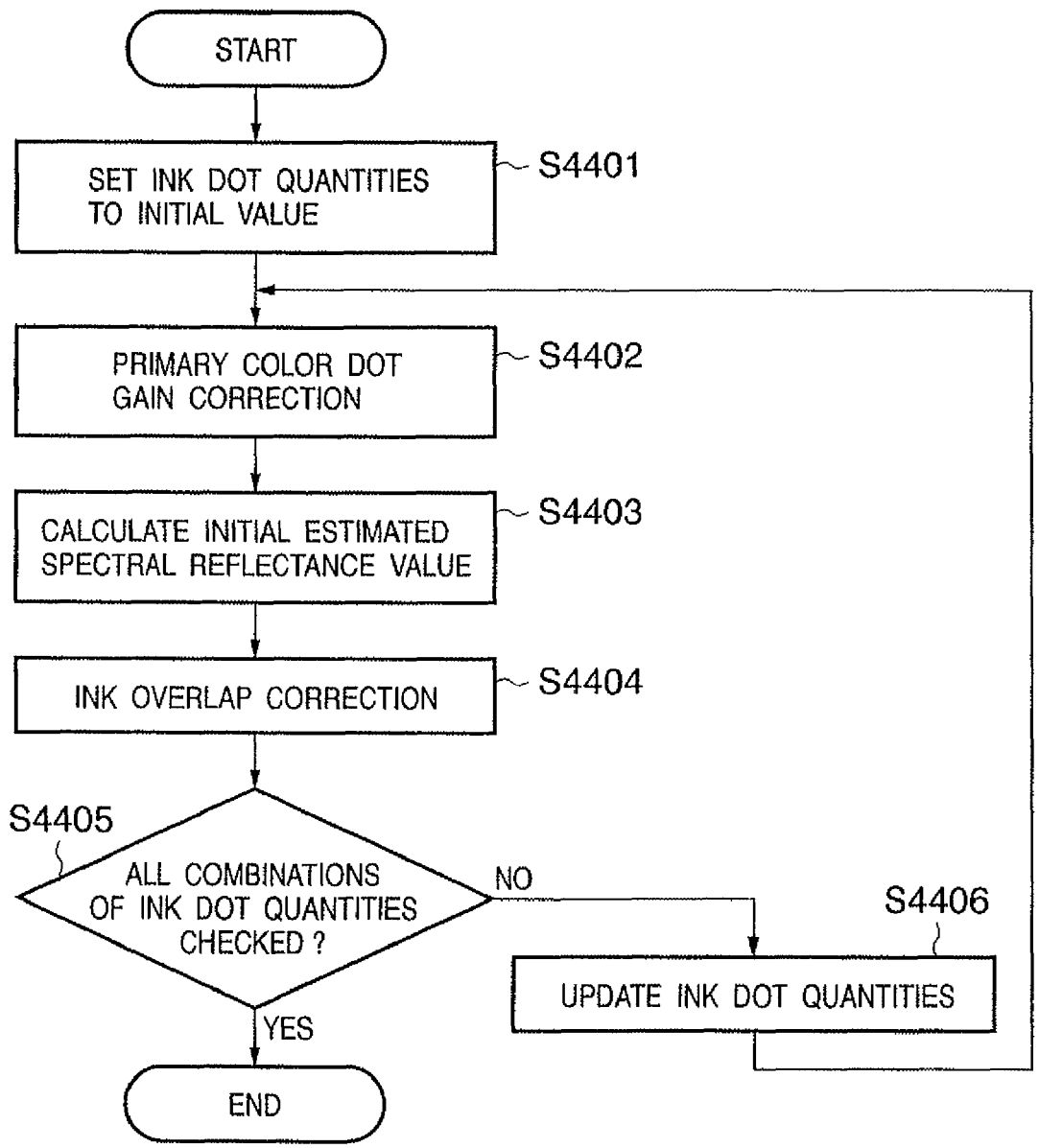
FIG. 27 is a flow chart for explaining an output estimation process according to the sixth embodiment.

Details of the output estimation process in step S4205 will be described below using FIG. 27. FIG. 27 is a flow chart for explaining the output estimation process according to the sixth embodiment.

Referring to FIG. 27, steps S4401 to S4404 are the same as steps S301 to S304 of the first embodiment (FIG. 3). That is, in step S4401 all the dot quantities of inks to be adopted are set to be an initial values (e.g., 0%). In step. S4402, dot gain correction of primary colors is made (details have been explained using FIG. 4, and FIGS. 5A and 5B). In step S4403, using the spectral reflectances of inks that have undergone the primary color dot gain correction, an initial estimated spectral reflectance value is calculated using equations (5) to (7) above based on the KM theory (Kubelka-Munk theory). In step S4404, the initial estimated spectral reflectance value calculated in step S4403 undergoes ink overlap correction (details have been described using FIG. 6 and equation (8)).

It is checked in step S4405 if all combinations (e.g., in 1%-increments from 0% to 100%) of the dot quantities of the inks used have undergone output estimation. If YES in step S4405, the process ends; otherwise, the flow advances to step S4406. In step S4406, the ink dot quantities are changed by a given amount, and the flow returns to step S4402. If the spectral reflectance obtained by the above process is stored in correspondence with each combination of ink dot quantities, the estimation process explained using FIG. 27 need not be repeated, thus allowing high-speed processes.

As described above, according to the sixth embodiment, in a color conversion process for reproducing a target color, the spectral distribution characteristics of colors (e.g., color sample book or the like) designated by the user are pre-stored, and the stored characteristics are reproduced as faithfully as possible, thus realizing accurate color reproduction even in different observation environments.

Seventh Embodiment

The seventh embodiment will be described below. In the seventh embodiment, an output image is estimated on the basis of image data, and a desired color can be substituted by a desired color sample.

Figure 28:
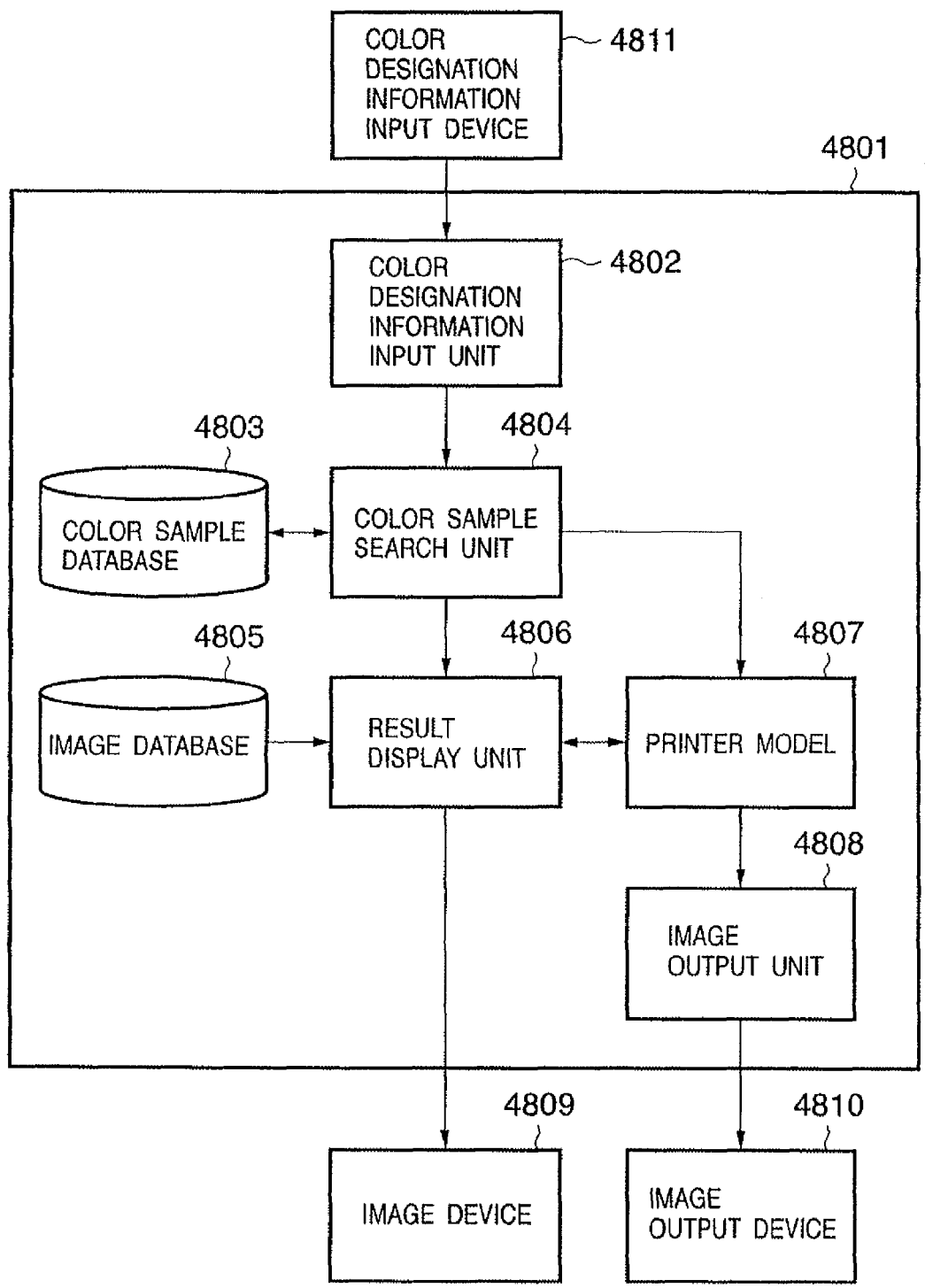
FIG. 28 is a block diagram showing the arrangement of a color reproduction apparatus according to the seventh embodiment.

FIG. 28 is a block diagram showing the arrangement of a color reproduction apparatus according to the seventh embodiment. Referring to FIG. 28, reference numeral 4801 denotes a color reproduction apparatus according to an embodiment of the present invention. Note that the color reproduction apparatus 4801 can be realized by executing a control program that implements processes to be described later using a versatile computer. Reference numeral 4802 denotes a color designation information input unit which inputs color designation information designated by the user using a mouse, keyboard, or the like. Reference numeral 4803 denotes a color sample database, which stores color samples in the form of pairs of color sample names and spectral reflectance data. Reference numeral 4804 denotes a color sample search unit, which searches the color sample database 4803 for spectral reflectance data of a color sample on the basis of the color designation information input by the color designation information input unit 4802. Reference numeral 4805 denotes an image database, which stores image data. Reference numeral 4806 denotes a result display unit, which displays an output estimation result and the like on a display device 4809. Reference numeral 4807 denotes a printer model, which estimates a color (spectral reflectance) to be output by a printer. Reference numeral 4808 denotes an image output unit, which controls an image output device 4810 to output an image.

Reference numeral 4809 denotes a display device, which comprises a CRT, LCD, or the like, and displays various user interfaces and also processing results under the control of the result display unit 4806. Reference numeral 4810 denotes an image output device, which comprises a color printer based on an ink-jet system, laser beam system, or the like. Reference numeral 4811 denotes a color designation information input device, which comprises a keyboard, mouse, and the like, and is used to input color designation information.

<Overall Process>

Figure 29:
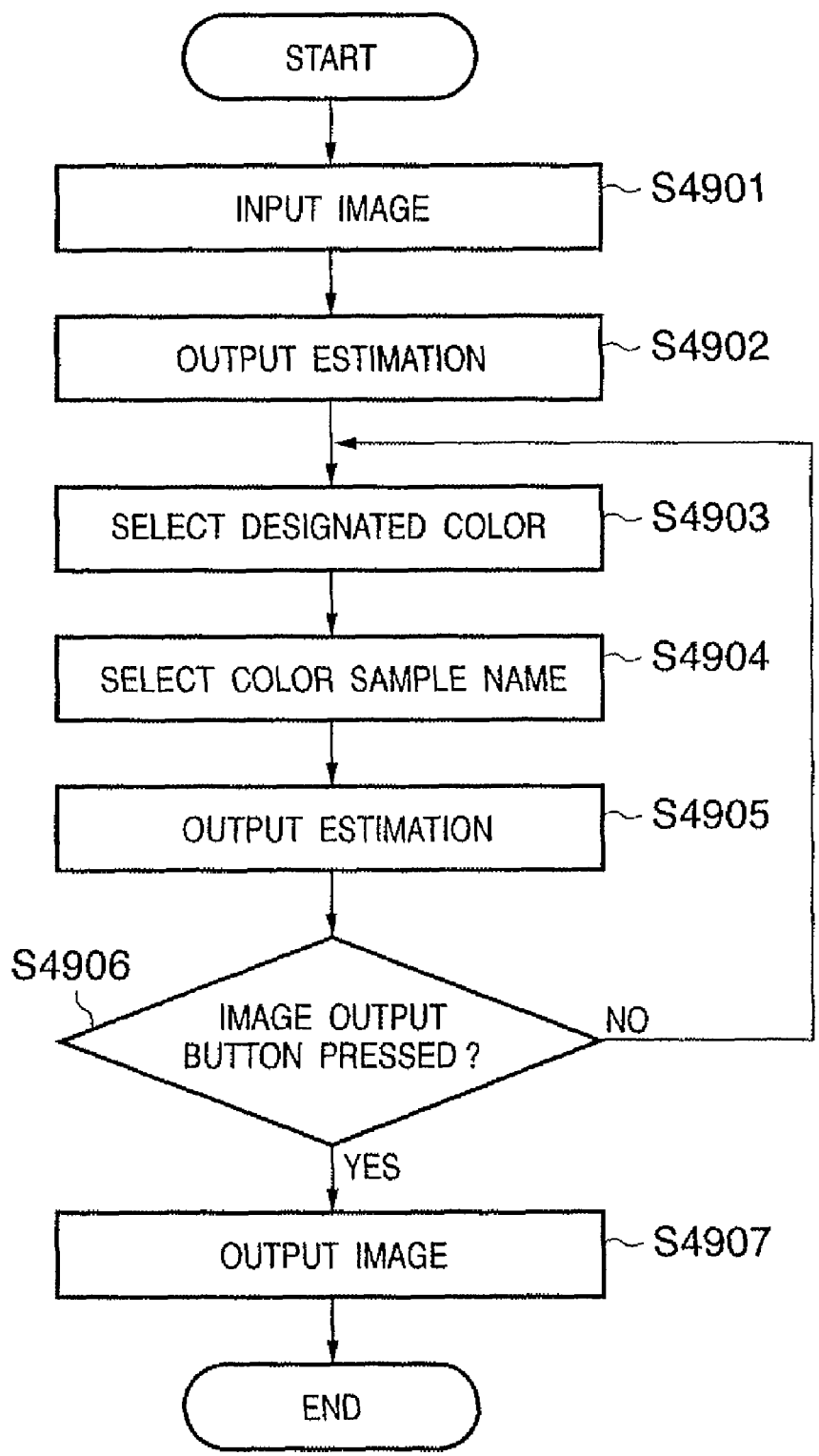
FIG. 29 is a flow chart showing a color reproduction process according to the seventh embodiment.
Figure 30:
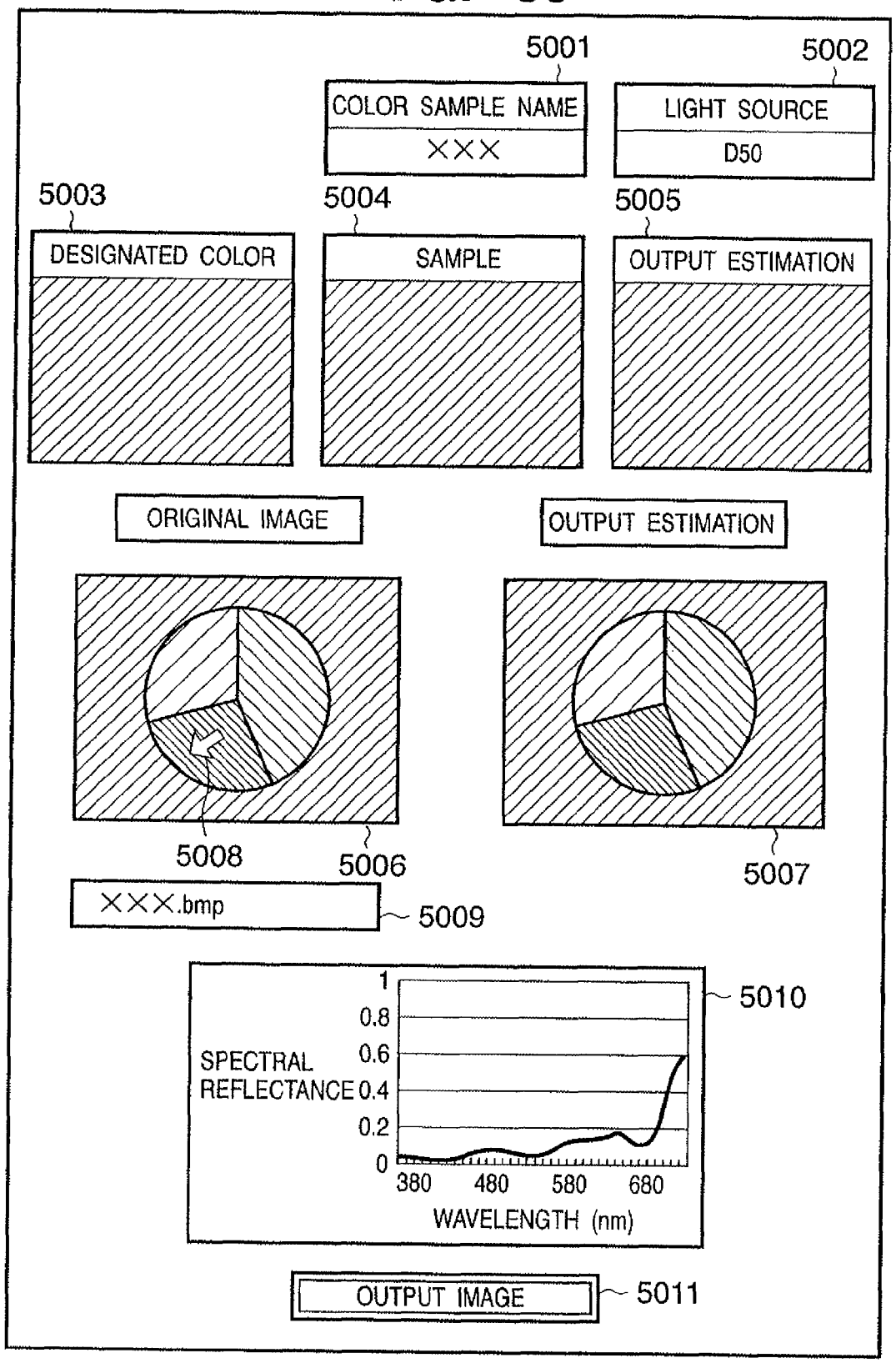
FIG. 30 shows an example of a user interface used in the color reproduction process of the seventh embodiment.

The operation of the color reproduction apparatus according to the sixth embodiment will be described in detail below. FIG. 29 is a flow chart for explaining the color reproduction process according to the seventh embodiment. FIG. 30 shows an example of a user interface used in the color reproduction process of the seventh embodiment.

In step S4901, the result display unit 4806 loads an image of user's choice at an image designation area 5009 from the image database 4805, and displays that image on an original image display area 5006. In step S5902, the printer model 4807 estimates the output spectral reflectance in the same sequence as that in the sixth embodiment. That is, the spectral reflectance is determined by comparing L, a, and b values obtained from the R, G, and B values of given pixel data, and those calculated from the spectral reflectance estimated in association with the ink dot quantities (the R, G, and B values of each pixel can be converted into L, a, and b values via an ICC profile or the like, and the ink dot quantities are determined to be closest to these L, a, and b values). At this time, tristimulus values L, a, and b are calculated from the estimated spectral reflectance of each pixel, and are converted into the device R, G, and B values of the display device 4809 using an ICC profile or the like. Then, the device R, G, and B values are displayed on an estimated output image display area 5007.

In step S4903, the user designates a pixel to be color-designated on the original image display area 5006 by operating a color designation pointer 5008 by a mouse or the like. At this time, the R, G, and B values of the designated pixel are displayed on a designated color display area 5003. In step S4904, the user selects a desired color from color samples in a color sample name input area 5001 so as to designate a color to be actually output as the designated color. That is, the color sample search unit 4804 loads spectral reflectance data of the color sample designated in the color sample name selection area 5001 from those of the color samples stored in the color sample database 4803. The loaded spectral reflectance data of the color sample is displayed on a spectral reflectance display area 5010, and is converted into the device R, G, and B values of the display device 4809 using an ICC profile or the like. The device R, G, and B values are displayed on a color sample confirmation area 5004.

In step S4905, the printer model 4807 executes output estimation in the same sequence as that explained in the sixth embodiment to acquire ink dot quantities, which can form a color (spectral reflectance) closest to the color sample. The spectral reflectance, which is estimated to be closest to the color sample, is displayed on the spectral reflectance display area 5010. The estimated spectral reflectance is converted into the device R, G, and B values of the display device 4809 using an ICC profile or the like, and the obtained device R, G, and B values are displayed on an output estimation confirmation area 5005. Then, an updated estimated output image is displayed on an estimated output image display area 5007.

If the user has pressed an image output button 5011, the flow advances from step S5906 to step S4907 to output an image. That is, when the user wants to redo color designation of a desired pixel after he or she observes the output estimation result or the like displayed on the estimated output image display area 5007, he or she can make color modification by repeating selection of a designated color without pressing the image output button 5011. If the satisfactory output estimation result is obtained, the user can obtain an image output from the image output device 4810 by pressing the image output button 5011. That is, in step S4907 the image output unit 4808 controls the image output device 4810 to output an image. Note that all pixels having the same color as that of the designated pixel in the above process are substituted by the color sample. That is, pixels having the same L, a, and b values as those of the designated pixel appear as the same color in a specific observation environment. Since the user makes color correction by observing colors on that display, the same colors must be output. Hence, when the spectral reflectance of a given pixel is updated, all pixels having the same L, a, and b values are updated.

As described above, according to the sixth and seventh embodiments, a color conversion process that reproduces a target color faithfully reproduces the spectral distribution characteristics of a color of user's choice, thus implementing a color conversion process which realizes accurate color reproduction even in different observation environments.

<Color Sample Database>

FIGS. 31, 32, and 33 show examples of the data configurations of the color sample databases 4003 and 4803. FIG. 31 shows an initial state of the database which stores color sample names and spectral reflectance data corresponding to the color sample names. In the above embodiment, if the color reproduction prediction result is additionally stored in the database, ink dot quantities obtained as a color reproduction prediction result of the color sample are additionally stored, as shown in FIG. 32. The additional storage method of the ink dot quantities is not limited to such specific method. For example, as shown in FIG. 33, the spectral reflectance measured values of actually output patches may be additionally stored as new user output data, in addition to the ink dot quantities. The number of color samples is not fixed to a given value, and the user may add newly measured color sample data as needed. Note that the additionally registered user output data and color sample data can undergo the search process of the aforementioned color sample search units 4004 and 4804.

<User Interface>

In the sixth and seventh embodiments, FIGS. 26 and 30 show examples of the user interface. However, the user interface format is not limited to the illustrated ones. For example, the user selects a desired light source on the light source information selection area 4302 or 4002. Alternatively, a file that describes light source data in advance may be loaded.

That is, the configuration of the user interface is not particularly limited as long as the user can make required setups.

<Output Estimation>

A method which can be applied to output estimation in the printer model of each of the first to seventh embodiments is not limited to the aforementioned estimation method. For example, a conventional output estimation method based on a neural network may be used, or the Neugebauer equation using the Yule-Nielsen correction equation may be used. That is, the output estimation method is not particularly limited as long as it can predict an output using ink spectral reflectance data and dot quantities.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

<Storage Medium>

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a flexible disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the claims.

The invention claimed is:

1. A color processing apparatus for calculating spectral data from a color signal indicated by a plurality of color components, said apparatus comprising:
   a holding unit constructed to hold information for calculating spectral data with respect to each category of a plurality of categories of objects;
   an acquiring unit constructed to acquire a color signal indicated by a plurality of color components and a category of the color signal; and
   a calculator constructed to calculate spectral data of the color signal by using information for calculating spectral data corresponding to the category of the color signal,
   wherein said information is held in said holding unit.

2. The color processing apparatus according to claim 1, wherein the information for calculating the spectral data comprises principal component data.

3. The color processing apparatus according to claim 1, wherein said acquiring unit acquires a category of the color signal for each pixel in an image.

4. The color processing apparatus according to claim 1, further comprising a printer model which decides a color material quantity for a printer by using the calculated spectral data as a target, and
   wherein said printer model decides the color material quantity so that the difference between the calculated spectral data and spectral data of the color material quantity becomes small.

5. A color processing method for calculating spectral data from a color signal indicated by a plurality of color components, said method comprising:
   using a processor to perform the steps of:
   holding, in a holding unit, information for calculating spectral data with respect to each category of a plurality of categories of objects;
   acquiring a color signal indicated by a plurality of color components and a category of the color signal;
   calculating spectral data of the color signal by using information for calculating spectral data corresponding to a category of the color signal, held in the holding unit.

6. A computer readable memory that stores a control program causing a computer execute a color processing for calculating spectral data from a color signal indicated by a plurality of color components, said processing comprising steps of:
   holding, in a holding unit, information for calculating spectral data with respect to each category of a plurality of categories of objects;
   acquiring a color signal indicated by a plurality of color components and a category of the color signal;
   calculating spectral data of the color signal by using information for calculating spectral data corresponding to a category of the color signal, held in the holding unit.

* * * * *